(12) United States Patent
Becker et al.

(10) Patent No.: US 12,553,071 B2
(45) Date of Patent: Feb. 17, 2026

(54) GENETICALLY ENGINEERED STRAINS WITH REDUCED BYPRODUCT FORMATION

(71) Applicant: DSM IP Assets B.V., Heerlen (DK)

(72) Inventors: Peter Becker, Hørsholm (DK); Manos Papadakis, Hørsholm (DK)

(73) Assignee: DSM IP Assets B.V., Heerlen (DK)

( * ) Notice: Subject to any disclaimer, the term of this patent is extended or adjusted under 35 U.S.C. 154(b) by 0 days.

(21) Appl. No.: 18/736,354

(22) Filed: Jun. 6, 2024

(65) Prior Publication Data

US 2024/0409972 A1    Dec. 12, 2024

(30) Foreign Application Priority Data

Jun. 7, 2023  (DK) .............................. PA202330070

(51) Int. Cl.
*C12P 19/04* (2006.01)
*C12N 1/205* (2026.01)
*C12R 1/19* (2006.01)

(52) U.S. Cl.
CPC ............. *C12P 19/04* (2013.01); *C12N 1/205* (2021.05); *C12N 2510/02* (2013.01); *C12N 2511/00* (2013.01); *C12R 2001/19* (2021.05); *C12Y 204/00* (2013.01); *C12Y 207/08001* (2013.01)

(58) Field of Classification Search
None
See application file for complete search history.

(56) References Cited

U.S. PATENT DOCUMENTS

| | | | |
|---|---|---|---|
| 9,234,225 B2 * | 1/2016 | Dekany ............ | C12Y 302/0114 |
| 9,896,470 B2 * | 2/2018 | Schroven ................ | A23L 33/10 |
| 10,499,668 B2 * | 12/2019 | Brassart .................. | A23L 33/40 |
| 10,829,508 B2 * | 11/2020 | Papadakis ...... | C12Y 204/99001 |
| 11,142,541 B2 * | 10/2021 | Khanzhin ................ | C12P 19/12 |
| 11,312,741 B2 * | 4/2022 | Chassagne ............ | B01D 15/363 |
| 2020/0181665 A1 * | 6/2020 | Jennewein ............. | A23L 33/125 |
| 2022/0211061 A1 * | 7/2022 | Geistlinger ............. | A61P 37/00 |
| 2023/0193335 A1 * | 6/2023 | Pedersen ........ | C12Y 204/01065 |
| | | | 435/101 |

FOREIGN PATENT DOCUMENTS

| | | | | |
|---|---|---|---|---|
| WO | WO 2015150328 | | 8/2015 | |
| WO | WO 2015197082 | | 12/2015 | |
| WO | WO 2017182965 | | 10/2017 | |
| WO | WO-2014153253 A1 * | 4/2019 | ............... | C07H 1/00 |
| WO | WO 2020255054 | | 12/2020 | |
| WO | WO 2021160829 | | 2/2021 | |
| WO | WO 2021148610 | | 7/2021 | |
| WO | WO 2021148611 | | 7/2021 | |
| WO | WO 2021160830 | | 8/2021 | |
| WO | WO 2021148615 | | 9/2021 | |
| WO | WO-2022243311 A1 * | 11/2022 | ............ | C07K 14/195 |

OTHER PUBLICATIONS

Bontemps-Gallo et al., Osmoregulated Periplasmic Glucans, EcoSal Plus. Jun. 2017;7(2).
Bych et al., 2019 Current Opinion in Biotechnology 56:130-137.
Deng et al., 2019 ACS Synth. Biol. 8: 2418-2427.
Rice, et al. EMBOSS: The European Molecular Biology Open Software Suite, 2000, Trends Genet. 16: 276-277.
Genbank, "beta-(1,3)-galactyltransferase, partial [Helicobacter pylori]", Accession No. AEZ55696.1, Mar. 23, 2012.
GenBank, "Multispecies: MFS transporter [Pantoea]", Accession No. WP_048785139.1, Aug. 31, 2023.
GenBank, "Major facilitator superfamily MFS_1 [Yersinia bercovieri ATCC 43970]" , Accession No. EEQ08298.1., Jun. 1, 2009.
GenBank, "*E. coli* gene lacZ coding for beta-galactosidase (EC 3.2.1.23)", Accession No. V00296.1 (GI:41901), Jul. 26, 2016.
Genbank, "glycosyltransferase [*Escherichia coli*]", Accession No. WP_000582563.1, Oct. 2, 2023.
GenBank, "glycosyltransferase family 25 protein [Helicobacter pylori]" Accession No. WP_001262061.1, Nov. 7, 2018.
Genbank, "WO 2002088364-A/1: Beta-1,3-galactose transferase and DNA encoding the same", Accession No. BD182026.1, Aug. 5, 2014.
Herring and Blattner 2004 J. Bacteriol. 186: 2673-81.
Lv et al., Bioprocess Biosyst Eng 20 (2016) 39:1737-1747.
Murphy, J Bacteriol. (1998);180(8):2063-7.
Muyrers et al., EMBO Rep. (2000) 1(3): 239-243.
GenBank, "glycosyltransferase family 2 protein [Neisseria meningitidis]", Accession No. WP_033911473.1, Mar. 20, 2023.
Needleman and Wunsch, 1970, J. Mol. Biol. 48: 443-453.
Parschat et al., 2020 ACS Synth. Biol. 9:2784-27969.
Petschacher and Nidetzkya 2016 Journal of Biotechnology 235: 61-83.
Vetcher et al., Appl Environ Microbiol. (2005);71(4):1829-35.
Waddell C.S. and Craig N.L., Genes Dev. Feb. 1988;2(2):137-49.
Warming et al., 2005 Nucleic Acids Res. 33(4): e36).
Wenzel et al., Chem Biol. (2005), 12(3):349-56.
Zhang et al., Nature Genetics (1998) 20: 123-12.
Bhagwat, A.A.,e t al., "Role of Anionic Charges of Periplasmic Glucans of Shigella flexneri in Overcoming Detergent Stress," Foodborne Pathogens and Disease, 2012, vol. 9(7), pp. 632-637.
Bontemps-Gallo et al., "Biosynthesis of Osmoregulated Periplasmic Glucans in *Escherichia coli*: The Phosphoethanolamine Transferase Is Encoded by opgE," BioMed Research International, vol. 2013, Article ID 371429, 8 pages. doi.org/10.1155/2013/371429.
Reynolds, et al., "A Phosphoethanolamine Transferase Specific for the Outer 3-Deoxy-D-manno-octulosonic Acid Residue of *Escherichia coli* Lipopolysaccharide," The Journal of Biological Chemistry, 2005, vol. 280(22), pp. 21202-21211.

(Continued)

*Primary Examiner* — Hope A Robinson
(74) *Attorney, Agent, or Firm* — Neal, Gerber & Eisenberg LLP

(57) ABSTRACT

The present disclosure relates to the production of oligosaccharides, especially Human milk Oligosaccharides (HMOs) using a genetically engineered cell which has decreased or total loss of function of phosphoglycerol transferase I and II and/or phosphoethanolamine transferase and/or glucans biosynthesis protein C to reduce oligosaccharide by-products and/or increase oligosaccharide production.

20 Claims, 6 Drawing Sheets

Specification includes a Sequence Listing.

(56) References Cited

OTHER PUBLICATIONS

Second Technical Examination and Search Report for DK Patent Application No. PA202330070, dated Apr. 4, 2024, 3 pages.
Third Technical Examination and Search Report for DK Patent Application No. PA202330070, dated May 14, 2024, 3 pages.

* cited by examiner

A (1) = β1,2, (2) = β1,6

B

GENETICALLY ENGINEERED STRAINS WITH REDUCED BYPRODUCT FORMATION

CROSS-REFERENCE TO RELATED APPLICATIONS

This application claims priority to Denmark Application No. PA 2023 30070, filed on Jun. 7, 2023, the contents of which are fully incorporated herein by reference.

SEQUENCE LISTING

The computer-readable Sequence Listing submitted on Jun. 6, 2024 and identified as follows: 46,623 bytes ST.26 XML document file named "032991-8018 Sequence Listing.xml," created Jun. 5, 2024, is incorporated herein by reference in its entirety.

FIELD

The present disclosure relates to the production of oligosaccharides, especially Human Milk Oligosaccharides (HMOs) and the genetic engineering of suitable cells for producing oligosaccharides, by modifying the osmoregulated periplasmic glucan biosynthetic machinery of the cell, e.g., to obtain a reduced formation of phosphoglycerol and/or phosphoethanolamine and/or succinyl conjugated byproducts.

BACKGROUND

The design and construction of bacterial cell factories to produce oligosaccharides, such as Human Milk oligosaccharides (HMOs) is constantly developing to facilitate and improve production, including primary product yields, byproduct profile, lactose consumption, energy efficiency, strain stability etc., some of these efforts are summarized in Petschacher and Nidetzkya 2016 *Journal of Biotechnology* 235:61-83, Bych et al 2019 *Current Opinion in Biotechnology* 56:130-137, and Deng et al 2019 *ACS Synth. Biol.* 8:2418-2427.

Gram-negative bacteria, such as Enterobacteriaceae, have an osmoregulated periplasmic glucan (OPG) biosynthetic machinery, producing periplasmic oligosaccharides. OPG structures found in different bacterial species share several common characteristics: (i) D-glucose is the only constituent sugar; (ii) glucose units are linked, at least partially, by β-glycosidic bonds; (iii) there are a limited number of glucose units (5 to 24); (iv) in most cases, but with a few exceptions, OPG concentration in the periplasm increases in response to a decrease in environmental osmolarity. In many, but not all, species, the OPG backbones can be decorated to various extents with a variety of substituents. These substituents appear to belong to two classes: (i) residues originating from membrane phospholipids like phosphoglycerol, phosphoethanolamine, or phosphocholine; (ii) residues originating from intermediary metabolism like acetyl, succinyl, and methylmalonyl (Bontemps-Gallo 2017 EcoSalPlus 72) ESP-0001-2017, FIG. 2 of this paper is included here as FIG. 1 herein). The characterization of phosphoglycerol transferase I and II was already done in 1984 by Jacson et al (*Journal of Bacteriology,* 160:976-981) by deleting opgB (mdoB) in *E. coli* which resulted in synthesis of endogenous membrane-derived oligosaccharides devoid of phosphoglycerol residues.

In the MDO background strain used in the examples herein, the mdoH (opgH) gene has been deleted (see method section herein) to prevent the presence of larger amounts of unwanted oligosaccharides (by-products) in the HMO product produced by the cell as well as to redirect metabolic energy towards the formation of other sugar nucleotide precursors needed for HMO synthesis. WO 2021/160830 describes a glycominimized bacterial host cells featuring deletion of the genes opgG and opgH, which are responsible for the formation of the core structure of the OPGs, therefore also termed the OPG backbone enzymes.

SUMMARY

In a first aspect, the present disclosure relates to a genetically engineered bacterial cell which has decreased or total loss of function of phosphoglycerol transferase I and II and/or phosphoethanolamine transferase and/or OPG biosynthesis protein C. The cell is suitable for production of heterologous oligosaccharides and therefore comprises at least one recombinant nucleic acid sequence encoding at least one glycosyltransferase.

Preferably, the gene encoding the phosphoglycerol transferase I and II (opgB) and/or the gene encoding the phosphoethanolamine transferase (opgE) and/or OPG biosynthesis protein C (opgC), or functionally equivalent/homologous gene(s) thereof is/are deleted or rendered dysfunctional. In embodiments, such a genetically engineered bacterial cell is capable of producing or produces one or more oligosaccharides, such as one or more human milk oligosaccharides (HMOs) with a lacto-N-triose II (LNT-II) core structure. Preferably, such HMO is selected from the group consisting of LNT, LNnT, LNT-II, LNFP-I, LNFP-II, LNFP-III, LNFP-V, LNFP-VI, LNDFH-I, LNDFH-II, LNDFH-III, pLNH, F-pLNH I, pLNnH, LST a, LST b, LST c, DSLNT.

It is of particular interest that the genetically engineered bacterial cell produces a lower amount of phosphoglycerol-oligosaccharide and/or phosphoethanolamine-oligosaccharide and/or succinyl-oligosaccharide, when compared to a cell which does not have a decreased or total loss of function of a phosphoglycerol transferase I and II and/or a phosphoethanolamine transferase and/or OPG biosynthesis protein C (opgC).

In addition, the at least one recombinant nucleic acid sequence encoding at least one glycosyltransferase in the genetically engineered bacterial cell may comprise one or more heterologous nucleic acids encoding one or more heterologous glycosyltransferases selected from the group consisting of β-1,3-N-acetyl-glucosaminyltransferase(s), β-1,3-galactosyltransferase(s) and β-1,4-galactosyltransferase(s).

In additional embodiments, the genetically engineered bacterial cell is a gram-negative bacteria.

In particular embodiments, the engineered bacterial cell of the genus *Escherichia* sp., *Klebsiella* sp., *Salmonella* sp. or *Shigella* sp, such as e.g., *E. Coli*.

In a second aspect, the present disclosure relates to a method for producing an oligosaccharide product, wherein said method comprises,
  a. providing a genetically engineered cell as described herein,
  b. cultivating the genetically engineered cell in a culture medium under conditions permissive for the production of said oligosaccharide product; and optionally
  c. recovering said oligosaccharide product from the culture.

It is preferred that the production of the desired oligosaccharide is not reduced by more than 15%, preferably not by more than 10%, preferably not substantially reduced, when compared to a cell which does not have a decreased or total loss of function of a phosphoglycerol transferase I and II and/or a phosphoethanolamine transferase and/or OPG biosynthesis protein C.

In addition, it is desirable that the method produces a reduced amount of by-product oligosaccharides comprising a phosphoethanolamine and/or glycerophosphate moiety as compared to a method using a cell containing the phosphoglycerol transferase I and II and/or a phosphoethanolamine transferase or functional equivalents/homologues genes thereof. Such by-products may e.g., be the by-product(s) phosphoglycerol-LNT and/or phosphoethanolamine-LNT, or phosphoglycerol-LNnT and/or phosphoethanolamine-LNnT. Accordingly, in particular embodiments, the desired oligosaccharide is one or more human milk oligosaccharides (HMOs) selected from the group consisting of LNT, LNnT, LNT-II, LNFP-I, LNFP-II, LNFP-III, LNFP-V, LNFP-VI, LNDFH-I, LNDFH-II, LNDFH-III, pLNH, F-pLNH I, pLNnH, LST a, LST b, LST c, DSLNT, such as LNT or LNnT.

It is preferred that when the desired oligosaccharide is LNT the ratio of LNT:phosphoglycerol-LNT (w/w) produced in the culturing step according to said method is at least 500:1, such as at least 750:1, 1000:1, 2000:1 or such at least 5000:1. Along the same lines, when the desired oligosaccharide is LNT it is preferred that the ratio of LNT:phosphoethanolamine-LNT (w/w) produced in the culturing step according to said method is at least 50:1, such as at least 100:1, 300:1, 500:1 or such at least 1000:1.

A third aspect of the present disclosure relates to the use of a genetically engineered cell as described herein, in the production of an oligosaccharide product.

DETAILED DESCRIPTION

Figure 1:
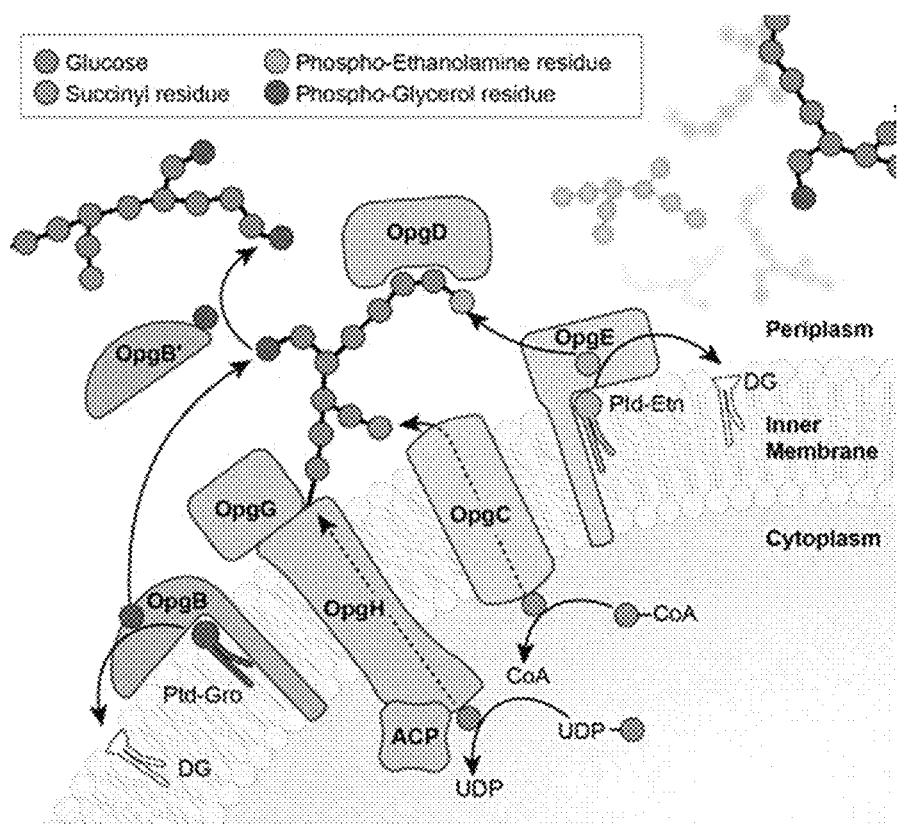
FIG. 1. Overview of key enzymes in the osmoregulated periplasmic glucan biosynthetic machinery relevant for the osmoregulated periplasmic glucan (OPG) synthesis in *E. coli* (from Bontemps-Gallo 2017 EcoSalPlus 72) ESP-0001-2017).

The objective of the present application is to enable a reduction in formation of unwanted oligosaccharide by-products in production of oligosaccharides, while also optimizing the energy expenditure of the production strain, which in turn may lead to an increased production yield of the desired oligosaccharide(s). The production of oligosaccharides is preferably a production of one or more heterologous oligosaccharides which are not naturally produced by the host cell. In preferred embodiments the heterologous oligosaccharides produced by the genetically engineered cell comprises at least one galactose (Gal) and/or N-acetyl-glucosamine (GlcNAc) moiety, preferably both at least one Gal and at least one GlcNAc moiety. The ratio of Gal:GlcNAc moieties are preferably between 1.5-2:1.

The genetically engineered cells described herein are preferably modified to enable the production of at least one desired heterologous oligosaccharide, such as at least one HMO. This modification can, for example, be the expression of at least one recombinant or heterologous glycosyltransferase or the engineering of nucleotide-activated sugar pathways needed for the production of the desired oligosaccharide. The genetically engineered cells are preferably suitable for industrial production of the desired oligosaccharide(s).

A first aspect of the invention relates to a genetically engineered gram-negative bacterial cell which has decreased or total loss of function of phosphoglycerol transferase I and II and/or phosphoethanolamine transferase, wherein said cell comprises at least one recombinant nucleic acid sequence encoding at least one glycosyltransferase.

The inventors have realized that impairing the part of the osmoregulated periplasmic glucan biosynthetic machinery, which is responsible for decorating the OPG backbone, can increase the amount of desired oligosaccharide product and prevent the formation of undesired oligosaccharide by-products, in particular the undesired decoration of the primary oligosaccharide product (e.g., LNT, LNnT or other HMO products). Especially, the deletion of the opgB gene encoding the phosphoglycerol transferase I and II (responsible for phosphoglycerol decoration) and the opgE gene encoding the phosphoethanolamine transferase (responsible for phosphoethanolamine decoration) from the OPG biosynthetic machinery prevents the formation of phosphoglycerol and phosphoethanolamine conjugated by-products, e.g., in particular phosphoglycerol and phosphoethanolamine decoration of the desired oligosaccharide product such as the HMO. Since such by-products and the desired product are similar in size, removal of these will require additional purification steps, which may also have an influence on the overall production yield e.g., due to product HMO being converted to undesired by-product, thereby affecting the overall cost of production.

Thus, avoiding side processes which e.g., lead to by-product formation in the production process is paramount when aiming to enhance the production of heterologous products in industrial-scale biological systems.

In the biosynthetic production of oligosaccharides, the formation of by-products is to a large extend inevitable, due to the complexity of the cellular processes required to maintain the cell viability and the plethora of processes undertaken by the cell while producing the desired oligosaccharide product. In particular, the glycosyltransferases catalyze the transfer of a sugar moiety from an activated sugar donor onto saccharide or non-saccharide acceptors. These glycosyltransferases are key for the biosynthesis of bioproducts, e.g., disaccharides, oligosaccharide and polysaccharides, glycolipids and glycoproteins. One strategy to reduce by-product formation have been to reduce the presence of non-product oligosaccharide, this have e.g., been done by utilizing specific glycosyltransferases, which are highly specific towards the intended acceptor oligosaccharide, see for example WO2024/013399.

In addition to the non-product oligosaccharides produced by glycosyltransferases, other cellular mechanisms, such as oligosaccharide decorating enzymes, are in some cases responsible for producing non-product oligosaccharides. Examples of such, are enzymes of the osmoregulated periplasmic glucan (OPG) biosynthetic machinery, which are responsible for producing the OPG backbone, e.g., opgG and opgH In gram-negative bacteria, phosphoglycerol and phosphoethanolamine is mainly found in the phosphatidylglycerol or phosphoethanolamine lipids in the membrane, and in the osmoregulated periplasmic glucans (OPGs), where they play a role in maintaining the membrane charge and periplasmic charge and overall resilience and virulence of the bacteria.

To our knowledge the enzymes in the osmoregulated periplasmic glucan (OPG) biosynthetic machinery, which are responsible for the decoration of the OPG backbone have never been considered in relation to unwanted oligosaccharide by-product formation.

Figure 3:
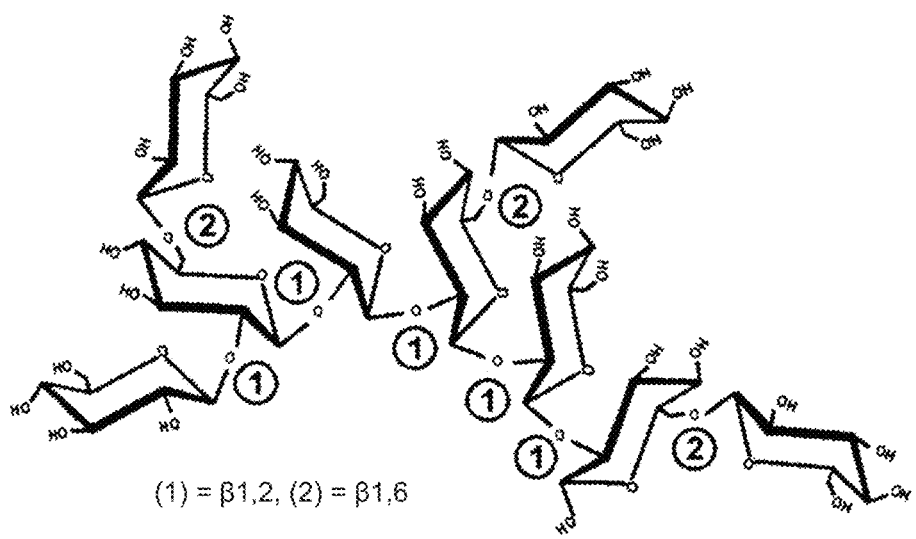
FIG. 3. Conformational structure of A) *E. coli* OPG with 9 glucose residues joined by β-1,2 and β-1,6 linkages and B) phosphoglycerol-LNT.
Figure 3:
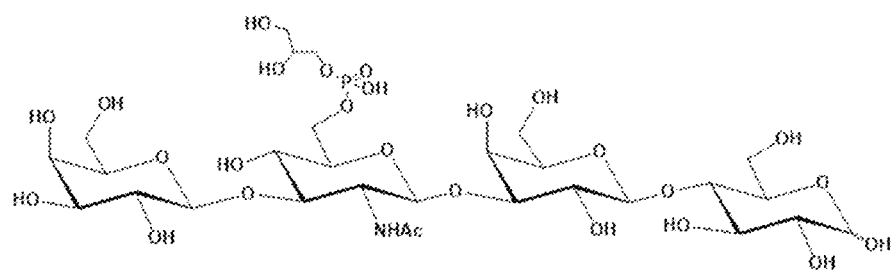

Surprisingly, the inventors of the present application realized that the oligosaccharides with a lacto-N-triose II (LNT-II) core structure are substrates for the decoration enzymes in the OPG biosynthetic machinery. FIG. 3 illustrates the conformational structures of an OPG which has 9 glucose residues joined by β-1,2 and β-1,6 linkages (Bontemps-Gallo et al., *Osmoregulated Periplasmic Glucans*, EcoSal Plus. 2017 June; 7 (2)) and LNT, where the glycosyl moieties are joined by β-1,3 and β-1,4 linkages.

Figure 4:
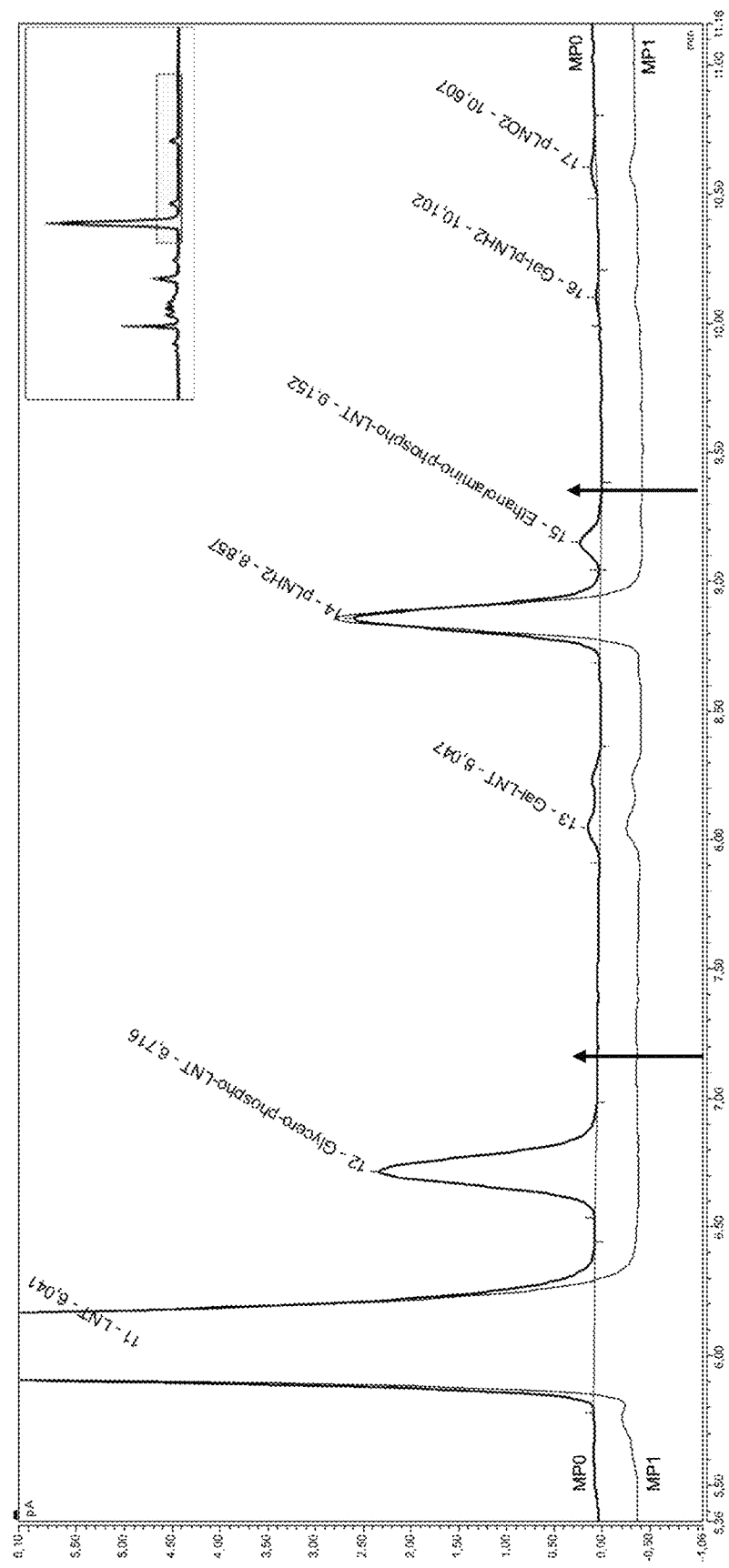
FIG. 4. Chromatogram of samples from fermentation of MP0 (control, top line) and MP1 (ΔopgB and ΔopgE, bottom line). Peak 11 eluting at 6.041 is LNT, peak 12 eluting at 6.716 is GP-LNT (marked with an arrow), Peak 13 eluting at 8.047 is Gal-LNT, peak 14 eluting at 8.857 is pLNnH, peak 15 eluting at 9.125 is EP-LNT (marked with an arrow), peak 16 eluting at 10.102 is galpLNH2. MP1 (the bottom line) shows that there is no production of the by-products EP-LNT and GP-LNT for MP1, compared to MP0 which has a phosphoglycerol-LNT peak eluting at 6.716 minutes (peak 12) and a phosphoethanolamine-LNT peak eluting at 9.152 minutes (peak 15), as indicated by the arrows.

Specifically, in the production of LNT from an *E. coli* strain where opgH is deleted two by-products, phosphoglycerol-LNT (GP-LNT) and phosphoethanolamine-LNT (EP-LNT) were identified on the HPLC chromatogram of the fermentation broth (FIG. 4). The pathway leading to the formation of these by-products was not immediately clear since the production strain *E. coli* produces a number of transferases that could be responsible for the production of the two species. However, the deletion of opgB and opgE resulted in elimination of these by-products.

Furthermore, it was observed that the deletion of opgB and opgE also has a beneficial effect on the total production of the desired oligosaccharide, in particular LNnT (FIG. 8), indicating that the energy optimization obtained by the deletion of opgB and opgE favors additional product formation.

Osmoregulated Periplasmic Glucans

Osmoregulated periplasmic glucans (OPGs), previously described as "membrane derived oligosaccharides" (MDOs) are oligosaccharides accumulated in the envelope of many Gram-negative bacteria. OPGs are essential for the cells to be able to adapt to osmotic fluxes. OPGs contain 6 to 12 glucose residues joined by α-1,2 and α-1,6 linkages, with the principal species containing eight to nine glucose units. OPGs are osmoregulated in that their synthesis and accumulation are inversely proportional to the osmotic strength of the environment. OPGs contains a glucose backbone that may be substituted (decorated) by various substituents such as succinyl, phosphor-glycerol and phosphoethanolamine moieties (FIG. 1). In *Escherichia coli* (*E. coli*), the OPGs are synthesized by the enzymes encoded by the opg genes, opgB, opgC, opgD, opgE, opgG and opgH (see FIG. 1), and acpP (denoted ACP in FIG. 1). The OPG backbone structure is synthesized by OpgH and OpgG. This backbone is further decorated with phosphoglycerol moieties by the two gene products OpgB and OpgB' (phosphoglycerol transferase I and II), phosphoethanolamine moieties by OpgE (phosphoethanolamine transferase) and succinyl moieties by OpgC (biosynthesis protein C) (FIG. 1).

In context of the present disclosure, it has been realized that oligosaccharides with an LNT-II backbone, in particular LNT, can be decorated by OpgB/B' and opgE, and potentially OpgC, as described in more details below. The decoration may not happen in all strains producing an oligosaccharide with an LNT-II backbone, since for the decoration to occur the oligosaccharide will have to be present in sufficient concentration in the periplasms of the production cell. Consequently, the deletion of ogpB, opgC and opqE are most likely to be beneficial in high producing strains.

In an embodiment, the strain which has decreased or total loss of function of phosphoglycerol transferase I and II and/or phosphoethanolamine transferase and/or OPG biosynthesis protein C, produce more than 50 g/L of the desired oligosaccharide, such as more than 60 g/L of the desired oligosaccharide, such as more than 70 g/L of the desired oligosaccharide in a fermentation, preferably in a large-scale fermentation.

Also, in strains which are highly efficient in exporting the desired oligosaccharide from the periplasm to the culture medium, no decoration by OpgB/B', opgC and/or opqE may be observed. None the less the deletion of the opgB, opgC and opqE genes may still be beneficial in such strains since they can result in increased product formation as observed for a LNnT producing strain (Example 2).

In an embodiment the strain which has decreased or total loss of function of phosphoglycerol transferase I and II and/or phosphoethanolamine transferase and/or OPG biosynthesis protein C, produce at least 5%, such as at least 10%, such as at least 15%, such as at least 20% more of the desired oligosaccharide than a comparative strain where the phosphoglycerol transferase I and II and/or phosphoethanolamine transferase and/or OPG biosynthesis protein C is not reduced (i.e., have opgB, opgC and/or opqE genes with activity similar or higher than the wild type opgB, opgC and opqE genes).

OpgB

The opgB gene of *E. coli* encodes two phosphoglycerol transferases (OpgB and OpgB') that are responsible for transferring a phosphoglycerol moiety from the phosphoglycerol containing phospholipids and onto the glucose backbone of the OPGs. The phosphoglycerol transferase I (OpgB in FIG. 1) is anchored to the inner membrane and cleaves the phosphoglycerol from the phosphoglycerol containing phospholipids, and the soluble periplasmic from of phosphoglycerol transferase I, which is also called phosphoglycerol transferase II (OpgB' in FIG. 1), which transfers phosphoglycerol residues from phosphatidylglycerols to the OPG molecules. Accordingly, it is well known that the phosphoglycerol transferase I and phosphoglycerol transferase II encoded by the opgB gene in *E. coli* can act as transferases which recognises glucose moieties in complex glucose oligosaccharides as suitable substrates for the transferase reaction and that these transferases transfer phosphoglycerol moieties onto the glucose moieties.

Surprisingly, as disclosed herein, the phosphoglycerol transferases encoded by the opgB gene can recognise non-glucose moieties in oligosaccharides and decorated the N-acetylglucosamine (GlcNAc) moiety in LNT with a phosphoglycerol moiety (verified by NMR and MS analysis of the elutes from the HPLC column at about 6.7 minutes). In general, phosphoglycerol conjugated oligosaccharides are unwanted by-products, when aiming to produce the pure oligosaccharide, such as the HMO LNT, wherein phosphoglycerol-LNT is an unwanted by-product. The production of such by-products in the fermentations requires additional down-stream purification to remove the by-product.

In embodiments, the gene encoding the phosphoglycerol transferase I and II (opgB) is deleted or rendered dysfunctional in the genetically engineered cell described herein.

In *E. coli* one example of the opgB gene comprises a nucleic acid sequence according to SEQ ID NO: 1, it is understood that there may be homologies across species and strains of the nucleic acid sequence encoding phosphoglycerol transferase I and II. In examples, the phosphoglycerol transferase I encoded by the opgB gene in *E. coli* comprises or consists of the amino acid sequence according to SEQ ID NO: 3. The phosphoglycerol transferase II encoded by the opgB gene in *E. coli* is obtained by native N-terminal truncation of SEQ ID NO: 3, removing the transmembrane domains of phosphoglycerol transferase I, i.e., the phosphoglycerol transferase II comprises or consists of the amino acid sequence which is approximately between position 130 to 763 and 165 to 763 of SEQ ID NO: 3.

Accordingly, in embodiments, a functional equivalent/homologous gene to the opgB gene of *E. coli* is deleted or rendered dysfunctional in the genetically engineered cell. Introducing of a nonsense mutation resulting in a premature stop codon can render the transcribed polypeptide dysfunctional can be used to generate host cells with total loss of function of the phosphoglycerol transferase I and/or phosphoglycerol transferase II. Furthermore, mutations in the active site of the phosphoglycerol transferase I and II can also reduce or abolish the functionality of the enzymes.

In embodiments, the gene product responsible for producing oligosaccharides with a phosphoglycerol moiety is deleted or rendered dysfunctional in the genetically modified bacterial cell.

In embodiments, the opgB gene is deleted from the genome of the genetically modified bacterial cell.

In embodiments, a functional equivalent/homologous gene to the opgB gene of *E. coli* is deleted or rendered dysfunctional.

In embodiments, a functional equivalent/homologue of the phosphoglycerol transferase I (OpgB), with an amino acid sequence which is at least 75%, such as at least 80%, such as at least 85%, such as at least 90%, such as at least 95%, such as at least 98% or such as at least 99% identical to SEQ ID NO: 3 is rendered dysfunctional in the genetically modified bacterial cell.

In embodiments, a functional equivalent/homologue of the phosphoglycerol transferase I (OpgB) is phosphoglycerol transferase II (OpgB').

Figure 6:
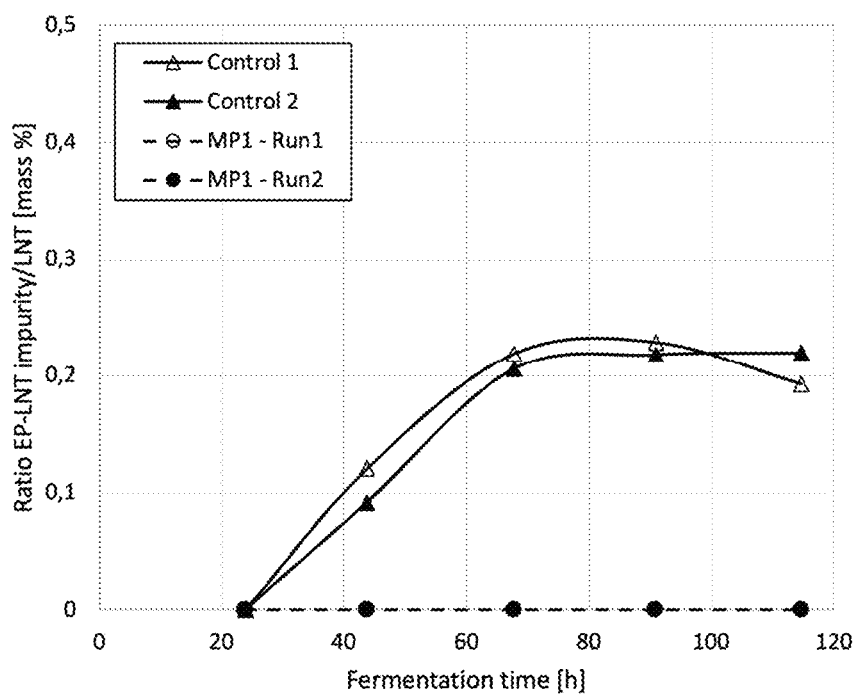
FIG. 6 Relative EP-LNT production (Ratio of EP-LNT:LNT (w/w %)) during fermentation of MP0 and MP1.
Figure 7:
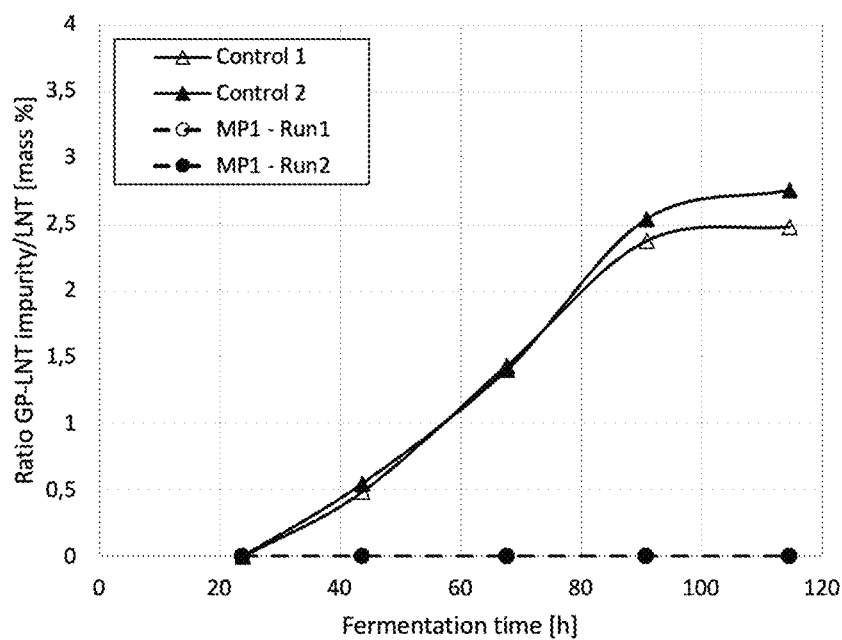
FIG. 7 Relative GP-LNT production (Ratio of GP-LNT:LNT (w/w %)) during fermentation of MP0 and MP1.

As is shown in example 1 and FIGS. 6 and 7, the deletion of both the opgB and opgE genes in the LNT producing strain resulted in an abolished phosphoglycerol-LNT and phosphoethanolamine-LNT production.

OpgE

The opgE gene encodes a phosphoethanolamine transferase (OpgE) that catalyze the phosphoethanolamine modification of the OPGs. OpgE catalyse the transfer of a phosphoethanolamine group from phosphatidylethanolamine lipids in the membrane to OPG in the periplasm.

Surprisingly, as is disclosed herein, the phosphoethanolamine transferase encoded by the opgE gene can recognise non-glucose moieties in oligosaccharides and decorated the N-acetylglucosamine (GlcNAc) moiety in LNT with a phosphoethanolamine moiety (verified by NMR and MS analysis of the elutes from the HPLC column at about 9.15 minutes). In general, phosphoethanolamine conjugated oligosaccharides are unwanted by-products, when aiming to produce the pure oligosaccharide, such as the HMO LNT, where phosphoethanolamine-LNT is an unwanted by-product. The production of such by-products in the fermentations requires additional down-stream purification to remove the by-product.

In embodiments, the gene encoding the phosphoethanolamine transferase (opgE) is deleted or rendered dysfunctional in the genetically engineered cell described herein. Introduction of a nonsense mutation resulting in a premature stop codon can render the transcribed polypeptide dysfunctional can be used to generate host cells with total loss of function of the phosphoglycerol transferase I and/or phosphoglycerol transferase II. Furthermore, mutations in the active site of the phosphoethanolamine transferase can also reduce or abolish the functionality of the enzymes.

In some *E. coli* strains the opgE gene comprises a nucleic acid sequence according to SEQ ID NO: 2. It is understood that there may be homologies across species and strains of the nucleic acid sequence encoding phosphoethanolamine transferase. In example, the phosphoethanolamine transferase encoded by the opgE gene comprises or consists of the amino acid sequence according to SEQ ID NO: 4.

In embodiments, the gene product responsible for producing oligosaccharides with a phosphoethanolamine moiety is deleted or rendered dysfunctional in the genetically modified bacterial cell.

In embodiments, the opgE gene is deleted in the genetically modified bacterial cell.

In embodiments, a functional equivalent/homologous gene to the opgE gene of *E. coli* is deleted or rendered dysfunctional.

In embodiments, a functional equivalent/homologue of the phosphoethanolamine transferase OpgE, with an amino acid sequence which is at least 75%, such as at least 80%, such as at least 85%, such as at least 90%, such as at least 95%, such as at least 98% or such as at least 99% identical to SEQ ID NO: 4, is rendered dysfunctional in the genetically modified bacterial cell.

OpgC

The opgC gene encodes OPG biosynthesis protein C (OpgC), which transfer succinyl residues from the cytoplasmic side of the membrane to the nascent glucan backbones on the periplasmic side of the membrane and catalyze the conjugation of succinyl residues to the OPGs. In general, succinyl conjugated oligosaccharides are unwanted by-products, when aiming to produce the pure oligosaccharide, such as an HMO with LNT-II core structure. The production of such by-products in the fermentations requires additional down-stream purification to remove the by-product.

In embodiments, the gene encoding the OPG biosynthesis protein C (opgC) is deleted or rendered dysfunctional in the genetically engineered cell described herein. Introducing of a nonsense mutation resulting in a premature stop codon can render the transcribed polypeptide dysfunctional can be used to generate host cells with total loss of function of the OPG biosynthesis protein C (OpgC). Furthermore, mutations in the active site of the OPG biosynthesis protein C can also reduce or abolish the functionality of the enzymes.

In some *E. coli* strains the opgC gene comprises a nucleic acid sequence corresponding to position 1,107,784 to 1,108, 941 of GenBank: CP032667.1 (*Escherichia coli* str. K-12 substr. MG1655 DNA, complete genome). It is understood that there may be homologies across species and strains of the nucleic acid sequence encoding OpgC. In example, the OPG biosynthesis protein C encoded by the opgC gene comprises or consists of the amino acid corresponding to UniProt accession nr. P75920 or RefSeq ID. NP_415565.1.

In embodiments, the gene product responsible for producing oligosaccharides with a succinyl moiety is deleted or rendered dysfunctional in the genetically modified bacterial cell.

In embodiments, the opgC gene is deleted in the genetically modified bacterial cell.

In embodiments, a functional equivalent/homologous gene to the opgC gene of *E. coli* is deleted or rendered dysfunctional.

In embodiments, a functional equivalent/homologue of the biosynthesis protein C (OpgC), with an amino acid sequence which is at least 75%, such as at least 80%, such as at least 85%, such as at least 90%, such as at least 95%, such as at least 98% or such as at least 99% identical to UniProt accession nr. P75920 is rendered dysfunctional in the genetically modified bacterial cell.

Due to the nature of the OPGs and the complex cellular pathways involved in their synthesis, it could be envisioned that the deletion of the opgB and opgE genes would influence the production of the desired oligosaccharide(s) in unforeseen ways, such as by negatively influencing the production of the desired oligosaccharide. For the production of LNT this was not shown to be the case, since the deletion of the opgB and opgE genes in the LNT production strain largely didn't influence the yield of LNT produced.

By "deleted" is meant that the coding region is removed completely or in part such that no (functional) gene product is produced. By inactivated or "rendered dysfunctional" is meant that the polypeptide coding nucleic acid sequence has been altered such that the resulting gene product is functionally inactive or encodes for a gene product with less than 100%, e.g., 90%, 80%, 70%, 60%, 50%, 40%, 30% or 20% of the activity of the native, naturally occurring, endogenous gene product. A "not mutated" gene or protein does not differ from a native, naturally occurring, or endogenous coding sequence by 1, 2, up to 5, up to 10, up to 20, up to 50, up to 100, up to 200 or up to 500 or more codons, or to the corresponding encoded amino acid sequence.

Oligosaccharides

In the present context, the term "oligosaccharide" means a sugar polymer containing at least three monosaccharide units, i.e., a tri-, tetra-, penta-, hexa- or higher oligosaccharide. The oligosaccharide can have a linear or branched structure containing monosaccharide units that are linked to each other by interglycosidic linkages. Particularly, the oligosaccharide comprises a lactose residue at the reducing end and one or more naturally occurring monosaccharides of 5-9 carbon atoms selected from aldoses (e.g., glucose, galactose, ribose, arabinose, xylose, etc.), ketoses (e.g., fructose, sorbose, tagatose, etc.), deoxysugars (e.g. rhamnose, fucose, etc.), deoxy-aminosugars (e.g. N-acetyl-glucosamine, N-acetyl-mannosamine, N-acetyl-galactosamine, etc.), uronic acids and ketoaldonic acids (e.g. N-acetyl-neuraminic acid). Accordingly, one or more one or more oligosaccharides may be produced. Preferably, the one or more oligosaccharides is one or more human milk oligosaccharides (HMOs).

Human Milk Oligosaccharides (HMOs)

Preferred oligosaccharides of the disclosure are human milk oligosaccharides (HMOs).

The term "human milk oligosaccharide" or "HMO" in the present context means a complex carbohydrate found in human breast milk. The HMOs have a core structure comprising a lactose unit at the reducing end that can be elongated by one or more beta-N-acetyl-lactosaminyl and/or one or more beta-lacto-N-biosyl unit, and this core structure can be substituted by an α-L-fucopyranosyl and/or an α-N-acetyl-neuraminyl (fucosyl) moiety. HMO structures are e.g., disclosed by Xi Chen in Chapter 4 of Advances in Carbohydrate Chemistry and Biochemistry 2015 vol 72.

HMOs are either neutral or acidic. In this regard, the non-acidic (or neutral) HMOs are devoid of a sialyl residue, and the acidic HMOs have at least one sialyl residue in their structure. The non-acidic (or neutral) HMOs can be fucosylated or non-fucosylated.

Examples of such neutral non-fucosylated HMOs include lacto-N-triose II (LNT-II) lacto-N-tetraose (LNT), lacto-N-neotetraose (LNnT), lacto-N-neohexaose (LNnH), para-lacto-N-neohexaose (pLNnH), para-lacto-N-hexaose (pLNH) and lacto-N-hexaose (LNH).

Examples of neutral fucosylated HMOs include 2'-fucosyllactose (2'FL), lacto-N-fucopentaose I (LNFP-I), lacto-N-difucohexaose I (LNDFH-I), 3-fucosyllactose (3'FL), difucosyllactose (DFL or LDFT), lacto-N-fucopentaose II (LNFP-II), lacto-N-fucopentaose III (LNFP-III), lacto-N-difucohexaose III (LNDFH-III), fucosyl-lacto-N-hexaose II (FLNH-II), lacto-N-fucopentaose V (LNFP-V), lacto-N-difucohexaose II (LNDFH-II), fucosyl-lacto-N-hexaose I (FLNH-I), fucosyl-para-lacto-N-hexaose I (FpLNH-I), fucosyl-para-lacto-N-neohexaose II (F-pLNnH II) and fucosyl-lacto-N-neohexaose (FLNnH).

Examples of acidic HMOs include 3'-sialyllactose (3'SL), 6'-sialyllactose (6'SL), 3-fucosyl-3'-sialyllactose (FSL), 3'-O-sialyllacto-N-tetraose a (LST a), fucosyl-LST a (FLST a), 6'-O-sialyllacto-N-tetraose b (LST b), fucosyl-LST b (FLST b), 6'-O-sialyllacto-N-neotetraose (LST c), fucosyl-LST c (FLST c), 3'-O-sialyllacto-N-neotetraose (LST d), fucosyl-LST d (FLST d), sialyl-lacto-N-hexaose (SLNH), sialyl-lacto-N-neohexaose I (SLNH-I), sialyl-lacto-N-neohexaose II (SLNH-II) and disialyl-lacto-N-tetraose (DSLNT).

In the context described herein, the desired oligosaccharides, such as HMOs, comprises a Gal and/or a GlcNAc saccharide unit, preferably both, such as the HMOs LNT-II, LNT and/or LNnT. Preferbly the ratio of Gal:GlcNAc is 1.5-2:1. In addition, the desired oligosaccharide, such as HMOs, comprises a lacto-N-triose II (LNT-II, GlcNAc (β1-3)Gal(β1-4)Glc) core structure. Preferably, an oligosaccharide with an LNT-II core structure has a glucose moiety at the reducing end. Examples of oligosaccharide with the LNT-II core structure are a Gal (β1-4) GlcNAc (β1-3)Gal (β1-4) Glc or Gal (β1-3) GlcNAc (β1-3) Gal (β1-4) Glc structure. Examples of HMOs comprising LNT-II core structure (or backbone) are e.g., LNT, LNnT, LNT-II, LNFP-I, LNFP-II, LNFP-III, LNFP-V, LNFP-VI, LNDFH-I, LNDFH-II, LNDFH-III, pLNH, F-pLNH I, pLNnH, LST a, LST b, LST c and DSLNT.

In one embodiment, the desired human milk oligosaccharide (HMO) is an HMO selected from the group consisting of LNT, LNnT, LNT-II, LNFP-I, LNFP-II, LNFP-III, LNFP-V, LNFP-VI, LNDFH-I, LNDFH-II, LNDFH-III, pLNH, F-pLNH I, pLNnH, LST a, LST b, LST c and DSLNT.

In a further embodiment the the desired human milk oligosaccharide (HMO) is an HMO selected from the group consisting of LNT-II, LNT, LNnT and LNFP-I.

By-Products

In the production of one or more specific desired HMOs, the synthesis may also result in unwanted oligosaccharides, such as HMOs species (e.g., pLNH2) or HMO derivate species (e.g., gal-LNT, EP-LNT or GP-LNT), described herein as by-products.

Examples of by-products are e.g., oligosaccharides comprising a phosphoglycerol- and/or phosphoethanolamine- and/or succinyl-moiety. In particular HMO products with a phosphoglycerol- and/or phosphoethanolamine- and/or succinyl-moiety (HMO derivate species) (see FIGS. 1 and 2).

The deletions of the transferases responsible for producing the phosphoglycerol and/or phosphoethanolamine and/or succinyl containing oligosaccharides, enables the production of oligosaccharides, without production of the phosphoglycerol and/or phosphoethanolamine and/or succinyl containing by-products.

Accordingly, a cell as presented herein which has a decreased or total loss of function of a phosphoglycerol transferase I and II (OpgB and OpgB') and/or phosphoethanolamine transferase (OpgE) and/or OPG biosynthesis protein C (OpgC), produces a reduced amount of by-product oligosaccharide(s), comprising a phosphoethanolamine- and/or a glycerophosphate- and/or succinyl-moiety, compared to a cell containing a functional phosphoglycerol transferase I (OpgB) and II (OpgB') and/or functional phosphoethanolamine transferase (OpgE) and/or OPG biosynthesis protein C (OpgC).

In embodiments, the function of the phosphoglycerol transferase I (OpgB) and/or II (OpgB') is decreased or completely abolished in the genetically modified cell suitable for producing oligosaccharides, in particular heterologous oligosaccharides. In embodiments, the function of the phosphoethanolamine transferase (OpgE) is decreased or completely abolished in the genetically modified cell suitable for producing oligosaccharides. In embodiments, the function of the OPG biosynthesis protein C (OpgC) is decreased or completely abolished in the genetically modified cell suitable for producing oligosaccharides, in particular heterologous oligosaccharides. In embodiments, the function of the phosphoglycerol transferase I (OpgB) and/or II (OpgB') and the function of the phosphoethanolamine transferase (OpgE) is decreased or completely abolished in the genetically modified cell suitable for producing oligosaccharides, in particular heterologous oligosaccharides. In embodiments, the function of the phosphoglycerol transferase I (OpgB) and/or II (OpgB') and the function of the phosphoglycerol transferase I (OpgB) and/or II (OpgB') and the function of the OPG biosynthesis protein C (OpgC) is decreased or completely abolished in the genetically modified cell suitable for producing oligosaccharides, in particular heterologous oligosaccharides. In embodiments, the function of the phosphoglycerol transferase I (OpgB) and/or II (OpgB') and the function of the phosphoethanolamine transferase (OpgE) and the function of the OPG biosynthesis protein C (OpgC) is decreased or completely abolished in the genetically modified cell suitable for producing oligosaccharides, in particular heterologous oligosaccharides. In embodiments, the function of the phosphoglycerol transferase I (OpgB) and/or II (OpgB') and the function of the phosphoglycerol transferase I (OpgB) and/or II (OpgB'), phosphoethanolamine transferase (OpgE) and the function of the OPG biosynthesis protein C (OpgC) is decreased or completely abolished in the genetically modified cell suitable for producing oligosaccharides, in particular heterologous oligosaccharides. In embodiments it is only the function of the phosphoglycerol transferase I (OpgB) and/or II (OpgB') and the function of the phosphoethanolamine transferase (OpgE) is decreased or completely abolished in the genetically modified cell suitable for producing oligosaccharides, in particular heterologous oligosaccharides.

Figure 2:
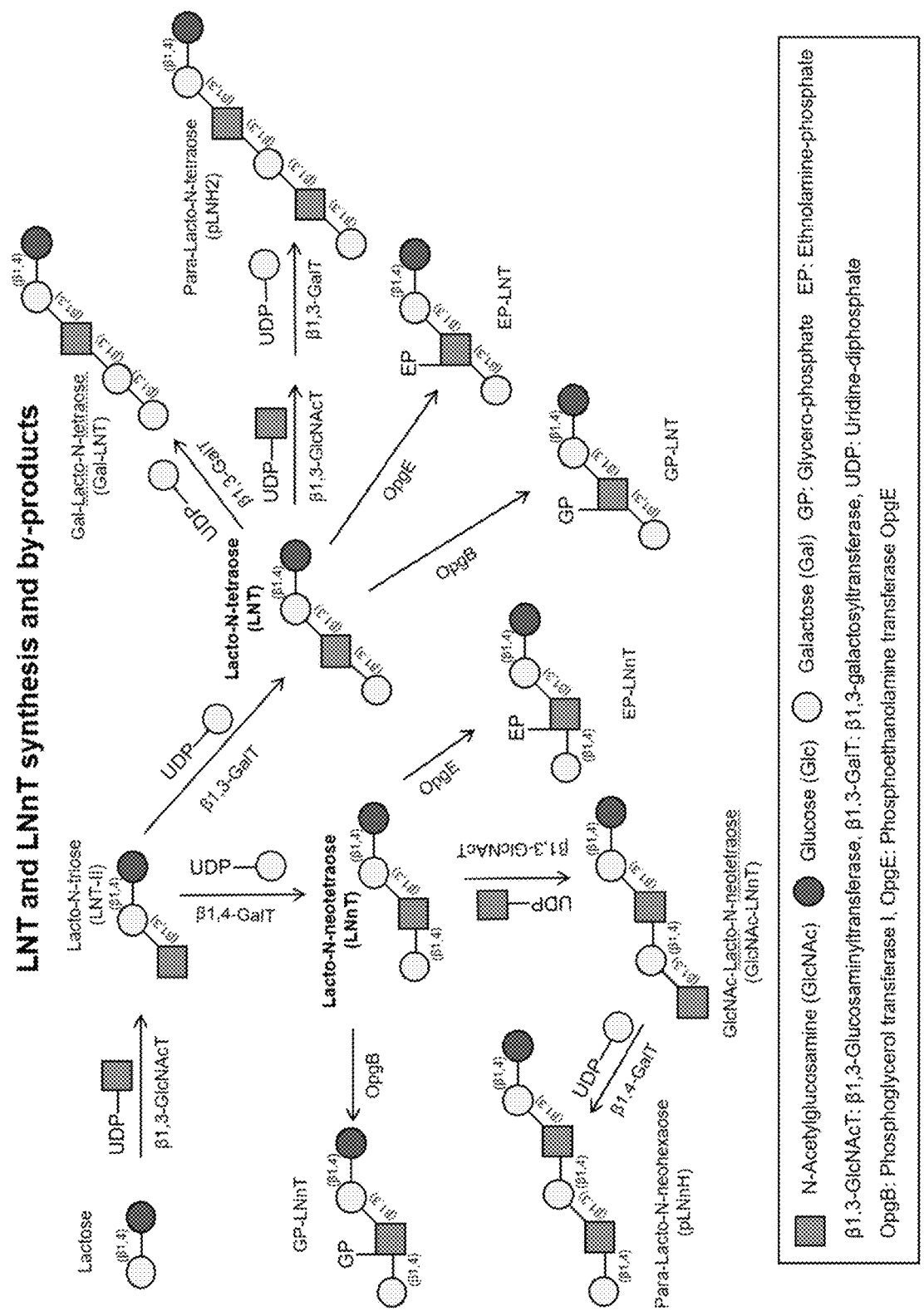
FIG. 2. Overview of LNT and LNnT synthesis with indication of the by-products phosphoglycerol-LNT (GP-LNT), phosphoethanolamine-LNT (EP-LNT), galactose-LNT, para-LNT, phosphoglycerol-LNnT (GP-LNnT) and phosphoethanolamine-LNnT (EP-LNnT), as well as GlcNAc-LNnT and pLNnH.

As can be seen in FIG. 2, in the LNT and LNnT production, the phosphoethanolamine and/or a glycerophosphate moiety are attached to the GlcNAc moiety of LNT or LNnT. It is therefore preferred that the decrease or loss of function of the phosphoglycerol transferase I and II and/or functional phosphoethanolamine transferase reduces the amount oligosaccharide produced carrying a phosphoethanolamine and/or a glycerophosphate modification to GlcNAc moieties.

Depending on the oligosaccharide(s) produced by the cell e.g., an HMO with an LNT-II core structure, the level of phosphoethanolamine and/or a glycerophosphate containing oligosaccharide by-product will also differ. The LNT producing strain MP0 presented in Example 1 produced about 0.21% (mass %) of phosphoethanolamine-LNT relative to the amount of LNT produced and about 2.6% (mass %) of phosphoglycerol-LNT relative to the amount of LNT produced.

Preferably, the ratio of desired oligosaccharide:phosphoglycerol-oligosaccharide (w/w) is at least 500:1, such as at least 750:1, 1000:1, 2000:1 or such at least 5000:1.

Preferably, the ratio of desired oligosaccharide:phosphoethanolamine-oligosaccharide (w/w) is at least 50:1, such as at least 100:1, 300:1, 500:1 or such at least 1000:1.

Accordingly, for an LNT producing strain it is highly preferable that the genetically engineered bacterial cell which has decreased or total loss of function of phosphoglycerol transferase I and II and/or phosphoethanolamine transferase, produces less than 0.2% (mass %) phosphoethanolamine-LNT relative to the amount of LNT produced, and less than 2.6% (mass %) of phosphoglycerol-LNT relative to the amount of LNT produced.

Thus, it is preferable that a cell which has a decreased or total loss of function of a phosphoglycerol transferase I and II and/or phosphoethanolamine as presented herein, produces a lower amount of phosphoglycerol-LNT and/or phosphoethanolamine-LNT or phosphoglycerol-LNnT and/or phosphoethanolamine-LNnT compared to a cell which does not have a decreased or total loss of function of a phosphoglycerol transferase I and II and/or a phosphoethanolamine transferase. Preferably, the ratio of LNT:phosphoglycerol-LNT (w/w) is at least 500:1, such as at least 750:1, 1000:1, 2000:1 or such at least 5000:1.

Additionally, it is preferred that the ratio of LNT:phosphoethanolamine-LNT (w/w) is at least 50:1, such as at least 100:1, 300:1, 500:1 or such at least 1000:1.

An Acceptor/Precursor Molecule

A genetically engineered cell according to the present disclosure comprises one or more recombinant nucleic acid sequences encoding one or more glycosyltransferases, which enables the production of a desired oligosaccharide, such as an HMO from a precursor molecule, such as a di- or oligosaccharide, e.g., lactose or LNT-II.

As described herein, an acceptor oligosaccharide is a molecule that can act as a substrate for a glycosyltransferase capable of transferring a glycosyl moiety from a glycosyl donor to the precursor molecule and is preferably a di- or trisaccharide. The glycosyl donor is preferably a nucleotide-activated sugar as described in the section on "Glycosyl-donor-nucleotide-activated sugar pathways". Preferably, the acceptor saccharide is a precursor for making a more complex oligosaccharide, such as an HMO, and can also be termed the precursor molecule.

The acceptor oligosaccharide can be either an intermediate product of the present fermentation process, an end-product of a separate fermentation process employing a separate genetically engineered cell, or an enzymatically or chemically produced molecule.

In the present context, said acceptor oligosaccharide for the production of the desired oligosaccharide, such as a desired HMO, is preferably lactose and/or LNT-II, which is either imported directly from production media or, in the case of LNT-II, produced from the initial precursor molecule lactose (e.g., acceptor for the β-1,3-N-acetyl-glucosaminyl-transferase) (see FIG. 2). The initial precursor molecule is preferably fed to the genetically engineered cell, which is capable of producing e.g., LNT-II, LNT, LNnT or more complex HMOs from the precursor molecule. Most often, the initial precursor is lactose, and the genetically engineered cell is capable of producing the intermediate precursors (acceptor oligosaccharides, e.g., LNT-II and LNnT) inside the cell. Alternatively, the initial precursor may also be LNT-II if the cell is capable of importing this.

As an alternative to feeding the precursor, such as lactose to the genetically engineered cell, the cell may be engineered to produce its own lactose (see for example Parschat et al. 2020 *ACS Synth. Biol.* 9:2784-27969).

Glycosyltransferases

Preferably, the genetically engineered cell according to the present disclosure comprises at least one recombinant nucleic acid sequence encoding at least one glycosyltransferase.

The genetically engineered cell according to the present disclosure may comprise one or more further recombinant nucleic acids encoding one or more recombinant and/or heterologous glycosyltransferase(s) capable of transferring a glycosyl residue from a glycosyl donor to an acceptor oligosaccharide. Preferably, the additional glycosyltransferase(s) enables the genetically engineered cell to synthesize LNT from a precursor molecule, such as lactose or LNT-II. In embodiments, the genetically engineered cell described herein, comprises one or more further recombinant nucleic acid encoding one or more recombinant and/or heterologous glycosyltransferase.

The glycosyltransferase(s) may be selected from the group consisting of galactosyltransferases, glucosaminyl-transferases, N-acetylglucosaminyl transferases and N-acetylglucosaminyl transferases. The glycosyltransferase(s) is preferably selected from the group consisting of galactosyltransferases and glucosaminyltransferases.

In one aspect, the glycosyltransferase(s) is selected from the beta-1,4-galactosyltransferases or beta-1,3-galactosyltransferases listed herein. In embodiments, the one or more glycosyltransferases are selected from the group consisting of β-1,3-N-acetylglucosaminyltransferase, β-1,4-galactosyltransferase and β-1,3-galactosyltransferase.

In one embodiment the cell is capable of producing or produces LNT and comprises a heterologous β-1,3-N-acetyl-glucosaminyltransferase(s) and a heterologous β-1,3-galactosyltransferase(s).

In another embodiment the cell is capable of producing or produces LNnT and comprises a heterologous β-1,3-N-acetyl-glucosaminyltransferase and a heterologous β-1,4-galactosyltransferase.

In addition, the genetically engineered cell may further comprise one or more heterologous nucleic acids encoding one or more heterologous glycosyltransferases selected from the group consisting of α-1,2-fucosyltransferase(s), α-1,3-fucosyltransferase, α-3,4-fucosyltransferase(s), α-2,3-sialyltransferase(s) and α-2,6-sialyltransferase(s). Such additional fucosyl transferases allow for the production of for example LNFP-I, LNFP-II, LNFP-III, LNFP-V, LNFP-VI, LNDFH-I, LNDFH-II, LNDFH-III, pLNH, F-pLNH I, pLNnH, LST a, LST b, LST c and DSLNT.

In embodiments, the β-1,3-N-acetylglucosaminyltransferase is from *Neisseria meningitidis*. In further embodiments, the β-1,3-galactosyltransferase and/or β-1,4-galactosyltransferase is from *Helicobacter pylori*, respectively.

Typically, the glycosyl donor is a nucleotide-activated sugar or an oligosaccharide, such as selected from the group consisting of glucose-UDP-GlcNAc, GDP-fucose, UDP-galactose, UDP-glucose, UDP-N-acetylglucosamine (UDP-GlcNAc), UDP-N-acetylgalactosamine (UDP-GalNAc) and CMP-N-acetylneuraminic acid (CMP-Neu5Ac), preferably UDP-Gal and/or UDP-GlcNAc.

Said glycosyl donor is synthesized by one or more genetically engineered cells and/or is exogenously added to the culture medium. Preferably, the glycosyl donor is a nucleotide-activated sugar which is synthesized by the host cell either using an already existing pathway, which may be modified to increase the pool of the relevant nucleotide-activated sugar or by introducing nucleotide sequences encoding for enzymes needed to produce the relevant nucleotide-activated sugar within the cell.

In embodiments, the at least one functional enzyme capable of transferring a saccharide moiety from a glycosyl donor to an acceptor oligosaccharide can be selected from the group consisting of beta-1,4-galactosyltransferases, such as galT and β-1,3-galactosyltransferase, such as galTK. These enzymes can for example be used to produce LNnT or LNT, respectively, starting from LNT-II as acceptor oligosaccharide.

In a preferred embodiment the genetically modified cell according to the present disclosure comprises at least one recombinant nucleic acid sequence encoding a glycosyltransferase capable of transferring a glycosyl residue from a glycosyl donor to said acceptor oligosaccharide to synthesize the desired oligosaccharide, preferably a heterologous oligosaccharide.

For the cell to be able to produce an oligosaccharide with a lacto-N-triose II (LNT-II) core structure, such as an HMO with a lacto-N-triose II (LNT-II) core structure, one or more recombinant nucleic acid sequence encoding a glycosyltransferase may be needed, e.g., for the synthesis of LNT-II from lactose an β-1,3-N-acetyl-glucosaminyl-transferase is needed, for the synthesis of LNT from LNT-II an β-1,3-galactosyltransferase is needed, and for the synthesis of LNT from lactose both a β-1,3-N-acetyl-glucosaminyl-transferase and a β-1,3-galactosyltransferase are needed. Likewise, for the synthesis of LNnT from LNT-II an β-1,4-galactosyltransferase is needed, and for the synthesis of LNnT from lactose both a β-1,3-N-acetyl-glucosaminyl-transferase and a β-1,4-galactosyltransferase are needed.

Such glycosyltransferase activities are preferably selected from the activities described below.

Heterologous β-1,3-N-acetyl-glucosaminyl-transferase

A β-1,3-N-acetyl-glucosaminyl-transferase is any protein which comprises the ability of transferring the N-acetyl-glucosamine of UDP-N-acetyl-glucosamine to lactose or another acceptor molecule, in a beta-1,3-linkage (see FIG. 2). Preferably the β-1,3-N-acetyl-glucosaminyl-transferase used herein does not originate in the species of the genetically engineered cell, i.e., the gene encoding the β-1,3-N-acetyl-glucosaminyl-transferase is of heterologous origin.

Accordingly, in embodiments, the genetically engineered cell comprises one or more recombinant nucleic acid sequence(s) encoding a β-1,3-N-acetyl-glucosaminyltransferase.

Non-limiting examples of β-1,3-N-acetyl-glucosaminyl-transferases are given in table 1. β-1,3-N-acetyl-glucosaminyltransferase variants may also be useful, preferably such variants are at least 80%, such as at least 85%, such as at least 90%, such as at least 95% identical to the amino acid sequence of any one of the β-1,3-N-acetyl-glucosaminyl-transferase in table 1.

TABLE 1

List of β-1,3-N-acetyl-glucosaminyltransferase

| Protein Name | GenBank ID | origin |
| --- | --- | --- |
| IgtA | WP_033911473.1<br>WP_002248149<br>AAF42258.1<br>ELK60643.1<br>WP_002218043.1 | Neisseria meningitidis |
| IgtA | AAK70338.1<br>ACF31229.1 | Neisseria gonorrhoeae |
| IgtA | AAK02595.1 | Pasteurella multocida |
| IgtA | EEZ72046.1 | Neisseria cinerea |
| HD0466 | WP_010944479.1 | Haemophilus ducreyi |
| PmnagT | WP_014390683.1 | Pasteurella multocida |

In embodiments, the genetically engineered cell comprises a recombinant nucleic acid sequence encoding a β-1,3-N-acetyl-glucosaminyltransferase. In one embodiment, the recombinant nucleic acid sequence encoding a β-1,3-N-acetylglucosaminyltransferase comprises or consists of the amino acid sequence of SEQ ID NO: 6 (LgtA from N. meningitidis) or a functional homologue thereof with an amino acid sequence with at least 80%, such as at least 85%, such as at least 90%, such as at least 95%, or such as at least 99% sequence identity to SEQ ID NO: 6.

For the production of LNnT or LNT from lactose as substrate, the LNT-II precursor is formed using a β-1,3-N-acetylglucosaminyltransferase. In embodiments, the genetically engineered cell comprises a β-1,3-N-acetylglucosaminyltransferase gene, or a functional homologue or fragment thereof, to produce the intermediate LNT-II from lactose.

Some of the examples below use the heterologous β-1,3-N-acetyl-glucosaminyl-transferase named LgtA from Neisseria meningitidis or a variant thereof.

Heterologous β-1,3-galactosyltransferase

A β-1,3-galactosyltransferase is any protein that possesses the ability of transferring the galactose of UDP-Galactose to an N-acetyl-glucosaminyl moiety to an acceptor molecule in a β-1,3-linkage (see FIG. 2). Preferably, a β-1,3-galactosyltransferase used herein does not originate in the species of the genetically engineered cell i.e., the gene encoding the β-1,3-galactosyltransferase is of heterologous origin.

In embodiments, the cell of the present disclosure comprises a β-1,3-glycosyltransferase and optionally a β-1,3-N-acetylglucosaminyltransferase.

As described herein the acceptor molecule, is an acceptor saccharide, e.g., LNT-II, or more complex HMO structures.

The examples below use the heterologous β-1,3-galactosyltransferase named GalTK or a variant thereof, to produce LNT.

β-1,3-galactosyltransferases can be obtained from any one of a number of sources, e.g., the galTK gene from H. pylori as described, (homologous to GenBank protein Accession BD182026.1) or the WbgO gene from E. coli 055: H7 (GenBank Accession WP_000582563.1) or the jhp0563 gene from H. pylori (GenBank Accession AEZ55696.1).

In one embodiment, the recombinant nucleic acid sequence encoding a β-1,3-galactosyltransferases comprises or consists of the amino acid sequence of SEQ ID NO: 7 (galTK from H. pylori) or a functional homologue thereof with an amino acid sequence with at least 80%, such as at least 85%, such as at least 90%, such as at least 95%, or such as at least 99% identity to SEQ ID NO: 7.

To produce LNT form an LNT-II precursor, a β-1,3-galactosyltransferase is needed. In one embodiment, the genetically modified cell comprises a β-1,3-galactosyltransferase gene, or a functional homologue or fragment thereof.

In further embodiments, the β1,3-N-acetylglucosaminyltransferase has an amino acid sequence according to SEQ ID NO: 6, or a functional homologue thereof with an amino acid sequence that is at least 80% identical to SEQ ID NO: 6 and the β-1,3-galactosyltransferase has an amino acid sequence according to SEQ ID NO: 7, or a functional homologue thereof with an amino acid sequence that is at least 80% identical to SEQ ID NO: 7.

Below are examples of genetically modified strains described herein with specific combinations of glycosyl transferases that will lead to production of LNT using lactose or LNT-II as initial substrate.

In one example, LgtA from Neisseria meningitidis is used in combination with galTK from Helicobacter pylori to produce LNT starting from lactose as initial substrate.

In one example, galTK from Helicobacter pylori is used to produce LNT starting from LNT-II as initial substrate.

Heterologous β-1,4-galactosyltransferase

A β-1,4-galactosyltransferase is any protein that comprises the ability of transferring the galactose of UDP-Galactose to a N-acetyl-glucosaminyl moiety to an acceptor molecule in a β-1,4-linkage (see FIG. 1). Preferably, a β-1,4-galactosyltransferase used herein does not originate in the species of the genetically engineered cell i.e., the gene encoding the β-1,4-galactosyltransferase is of heterologous origin. In the context described herein the acceptor molecule, is an acceptor saccharide, e.g., LNT-II, or more complex HMO structures.

The examples below use the heterologous β-1,4-galactosyltransferase GalT, or a variant thereof, to produce LNnT. Accordingly, in embodiments, the genetically engineered cell comprises one or more recombinant nucleic acid sequence(s) encoding a β-1,4-galactosyltransferase.

Non-limiting examples of β-1,4-galactosyltransferases are provided in table 2. β-1,4-galactosyltransferases variants may also be useful, preferably such variants are at least 80%, such as at least 85%, such as at least 90%, such as at least 95%, such as at least 99% identical to the amino acid sequence of any one of the β-1,4-galactosyltransferases in table 2.

TABLE 2

List of β-1,4-glycosyltransferases

| Protein Name | GenBank ID | Origin |
| --- | --- | --- |
| GalT | WP_001262061.1 | *Helicobacter pylori* |
| LgtB | AAF42257.1 | *Neisseria meningitidis* MC58 |

In one embodiment, the recombinant nucleic acid sequence encoding a β-1,4-galactosyltransferases comprises or consists of the amino acid sequence of SEQ ID NO: 8 (galT from *H. pylori*) or a functional homologue thereof with an amino acid sequence with at least 80%, such as at least 85%, such as at least 90%, such as at least 95%, or such as at least 99% sequence identity to SEQ ID NO: 8.

To produce LNnT form an LNT-II precursor, a β-1,4-galactosyltransferase is needed. In one embodiment, the genetically engineered cell comprises a β-1,4-galactosyltransferase gene, or a functional homologue or fragment thereof.

In embodiments, the β-1,3-N-acetylglucosaminyltransferase is from *Neisseria meningitidis* and the β-1,4-galactosyltransferase is from *Helicobacter pylori*. In further embodiments, the β1,3-N-acetylglucosaminyltransferase has an amino acid sequence according to SEQ ID NO: 6, or a functional homologue thereof with an amino acid sequence that is at least 80% identical to SEQ ID NO: 6 and the β-1,4-galactosyltransferase has an amino acid sequence according to SEQ ID NO: 8, or a functional homologue thereof with an amino acid sequence that is at least 80% identical to SEQ ID NO: 8.

In one example, LgtA from *Neisseria meningitidis* is used in combination with galT from *Helicobacter pylori* to produce LNnT starting from lactose as initial substrate.

In one example, galT from *Helicobacter pylori* is used to produce LNnT starting from LNT-II as initial substrate.

In one example, LgtA from *Neisseria meningitidis* is used in combination with LgtB from *Neisseria meningitidis* to produce LNnT starting from lactose as initial substrate.

In one example, LgtB from *Neisseria meningitidis* is used to produce LNnT starting from LNT-II as initial substrate.

To obtain more complex oligosaccharides with a lacto-N-triose II (LNT-II) core structure, such as fucosylated and/or sialylated derivates of LNT or LNnT, additional glycosyltransferase activities may be needed in the synthesis, in addition to the glycosyltransferase activities needed to produce LNT or LNnT.

Accordingly, the genetically engineered cell may further comprise one or more heterologous nucleic acids encoding one or more heterologous glycosyltransferases selected from the group consisting of α-1,2-fucosyltransferase(s), α-1,3-fucosyltransferase, α-1,3/4-fucosyltransferase(s), α-2,3-sialyltransferase(s) and α-2,6-sialyltransferase(s).

In embodiments where the complex oligosaccharide(s) with a lacto-N-triose II (LNT-II) core structure is/are fucosylated, the genetically engineered cell may further comprise one or more heterologous nucleic acids encoding one or more heterologous glycosyltransferases selected from the group consisting of α-1,2-fucosyltransferase(s), α-1,3-fucosyltransferase(s) and α-1,3/4-fucosyltransferase(s).

In embodiments where the complex oligosaccharide(s) with a lacto-N-triose II (LNT-II) core structure is/are sialylated the genetically engineered cell may further comprise one or more heterologous nucleic acids encoding one or more heterologous glycosyltransferases selected from α-2,3-sialyltransferase(s) and α-2,6-sialyltransferase(s).

Heterologous α-1,2-fucosyltransferase

A heterologous α-1,2-fucosyltransferase is a protein that comprises the ability to catalyze the transfer of fucose from a donor substrate, for example, GDP-fucose, to an acceptor molecule in an α-1,2-linkage. Preferably, an α-1, 2-fucosyltransferase used herein does not originate in the species of the genetically engineered cell i.e., the gene encoding the α-1, 2-fucosyltransferase is of heterologous origin. In the context of the present disclosure the acceptor molecule, is an acceptor oligosaccharide of at least three or four monosaccharide units, e.g., 2'-fucosyllactose, 3-fucosyllactose, LNT, LNFP-I or more complex HMO structures.

Non-limiting examples of α-1,2-fucosyltransferases are given in the table below. α-1,2-fucosyltransferase variants may also be useful. Preferably such variants comprise a sequence identity of at least 80%, such as at least 85%, such as at least 90, such as at least 95%, such as at least 99% sequence identity to an α-1,2-fucosyltransferase shown in table 8.

TABLE 8

List of α-1,2-fucosyltransferases

| Protein Name | GenBank ID | Origin |
| --- | --- | --- |
| FutC | WP_080473865.1 | *Helicobacter pylori* ATCC 26695 |
| wbgL | ADN43847 | *E. coli* O126 |
| Smob | WP_126455392.1 | *Sulfuriflexus mobilis* |
| FucT2_HpUA802 | AAC99764.1 | *Helicobacter pylori* |
| FucT2_EcO126t | ABE98421.1 | *Escherichia coli* |
| FucT2_Hm12198 | CBG40460.1 | *Helicobacter mustelae* 12198 |
| FucT2_Pm9515 | ABM71599.1 | *Brochlorococcus marinus* str. MIT 9515 |
| FucT2_HpF57 | BAJ59215.1 | *Helicobacter pylori* F57 |
| FucT54 | ADE13114.1 | *Sideroxydans lithotrophicus* ES-11 |
| Mtun | WP_031437198.1 | *Methylobacter tundripaludum* |

The heterologous α-1, 2-fucosyltransferase may for example be used to produce DFL or LNFP-I or LNDFH-I.

Heterologous α-1,3-fucosyltranferase

A heterologous α-1,3-fucosyltranferase refer to a glycosyltransferase that catalyzes the transfer of fucose from a donor substrate for example, GDP-fucose, to an acceptor molecule in an α-1,3-linkage. Preferably, an α-1,3-fucosyltransferase used herein does not originate in the species of the genetically engineered cell i.e., the gene encoding the α-1, 3-fucosyltransferase is of heterologous origin. In the context of the present disclosure the acceptor molecule, is an acceptor oligosaccharide of at least three or four monosaccharide units, e.g., 2'-fucosyllactose, 3-fucosyllactose, LNT, LNFP-I, or more complex HMO structures.

Non-limiting examples of α-1,3-fucosyltransferases are given in the table below. α-1,3-fucosyltransferase variants may also be useful. Preferably such variants comprise a sequence identity of at least 80%, such as at least 85%, such as at least 90, such as at least 95%, such as at least 99% sequence identity to an α-1,3-fucosyltransferase shown in table 9.

TABLE 9

List of α-1,3-fucosyltransferases

| Protein Name | GenBank ID | Origin |
| --- | --- | --- |
| FucT | AAB81031.1 | Helicobacter pylori NCTC 11639 |
| FutA | WP_000487428.1 | Helicobacter pylori ATCC 26695 |
| CafC | WP_007483358.1 | Bacteroides nordii |
| FucT6_3_Bf | CAH09151.1 | Bacteroides fragilis NCTC 9343 |
| FucT7_3_Bf | CAH09495.1 | Bacteroides fragilis NCTC 9343 |
| FucT_3_Am | ACD04596.1 | Akkermansia muciniphila ATCC BAA-835 |
| MAMA_R764 | AGC02224.1 | Acanthamoeba polyphaga moumouvirus |
| Mg791 | AEQ33441.1 | Megavirus chiliensis |
| Moumou_00703 | YP_007354660.1 | Acanthamoeba polyphaga moumouvirus |

The heterologous α-1, 3-fucosyltransferase may for example be used to produce 3FL, DFL, LNFP-III, LNFP-V, LNDFH-II or LNDFH-III.

Heterologous α-1,3/4-fucosyltransferase

A heterologous α-1,3/4-fucosyltransferase refer to a glycosyltransferase that catalyzes the transfer of fucose from a donor substrate for example, GDP-fucose, to an acceptor molecule in an α-1,3- or a 1,4-linkage. Preferably, an α-1,3/4-fucosyltransferase used herein does not originate in the species of the genetically engineered cell i.e., the gene encoding the α-1,3/4-fucosyltransferase is of heterologous origin. In the context of the present disclosure the acceptor molecule, is an acceptor oligosaccharide of at least three or four monosaccharide units, e.g., 2'-fucosyllactose, 3-fucosyllactose, LNT, LNFP-I or more complex HMO structures.

Non-limiting examples of α-1,3/4-fucosyltransferases are given in the table below. α-1,3/4-fucosyltransferase variants may also be useful. Preferably such variants comprise a sequence identity of at least 80%, such as at least 85%, such as at least 90, such as at least 95%, such as at least 99% sequence identity to an α-1,3/4-fucosyltransferases shown in table 10.

TABLE 10

List of α-1,3/4-fucosyltransferases

| Protein Name | GenBank ID | Origin |
| --- | --- | --- |
| FucTIII | AY450598.1 | Helicobacter pylori strain DSM 6709 |
| FutA | WP_000487428.1 | Helicobacter pylori ATCC 26695 |

The heterologous α-1,3/4-fucosyltransferase(s) may for example be used to produce 3FL, LNFP-II, LNFP-III, LNFP-V, LNFP-VI, LNDFH-I, LNDFH-II or LNDFH-III, or mixtures thereof.

Heterologous α-2,3-sialyltransferase

A heterologous α-2,3-sialyltransferase refer to a glycosyltransferase that catalyzes the transfer of sialyl from a donor substrate for example, CMP-N-acetylneuraminic acid, to an acceptor molecule in an α-2,3-linkage. Preferably, an α-2,3-sialyltransferase used herein does not originate in the species of the genetically engineered cell i.e., the gene encoding the 2,3-sialyltransferase is of heterologous origin. In the context of the present disclosure the acceptor molecule, is an acceptor oligosaccharide of at least three or four monosaccharide units, e.g., 3-fucosyllactose, LNT, LNnT or more complex HMO structures. Non-limiting examples α-2,3-sialyltransferases are given in the table below. α-2,3-sialyltransferase variants may also be useful. Preferably such variants comprise a sequence identity of at least 80%, such as at least 85%, such as at least 90, such as at least 95%, such as at least 99% sequence identity to an α-2,3-sialyltransferase shown in table 11.

TABLE 11

List of α-2,3-sialyltransferases

| Protein Name | GenBank ID | Origin |
| --- | --- | --- |
| Avi | WP_115249238.1 | Avibacterium avium |
| Ccol | WP_075498955.1 | Campylobacter coli |
| Ccol2 | EAH6554614.1 | Campylobacter coli |
| Chepa | WP_066776435.1 | Campylobacter hepaticus |
| Cinf1 | WP_011272254.1 | Haemophilus influenzae |
| Cjej1 | EBD1936710.1 | Campylobacter jejuni |
| Clari1 | EGK8106227.1 | Campylobacter lari |
| CstI | AAF13495.1 | Campylobacter jejuni |
| CstII | AAF31771.1 | Campylobacter jejuni |
| Csub1 | WP_039664428.1 | Campylobacter subantarcticus |
| MhnNBse | WP_176810284.1 | Mannheimia (multispecies) |
| Neigon | AAW89748.1 | Neisseria gonorrhoeae FA 1090 |
| Nst | AAC44541.1 | Neisseria meningitidis MC58 |
| PM70 | AAK03258.1 | Pasteurella multocida subsp. multocida str. Pm70 |
| PmN | WP_005726268.1 | Pasteurella (multispecies) |
| Pmult | WP_005753497.1 | Pasteurela multocida |
| Poral | WP_101774487.1 | Pasteurella oralis |
| Poral_2 | WP_101774701.1 | Pasteurella oralis |

The heterologous 2,3-sialyltransferase(s) may be used to produce for example 3'SL or LST-a, or fucosylated variants thereof if combined with expression of a fucosyltransferase.

Heterologous α-2,6-sialyltransferase

A heterologous α-2,6-sialyltransferase refer to a glycosyltransferase that catalyzes the transfer of sialyl from a donor substrate for example, CMP-N-acetylneuraminic acid, to an acceptor molecule in an α-2,6-linkage. Preferably, an α-2,6-sialyltransferase used herein does not originate in the species of the genetically engineered cell i.e., the gene encoding the 2,6-sialyltransferase is of heterologous origin. In the context of the present disclosure the acceptor molecule, is an acceptor oligosaccharide of at least three or four monosaccharide units, e.g., 3-fucosyllactose, LNT, LNnT or more complex HMO structures.

Non-limiting examples α-2,6-sialyltransferase are given in the table below. α-2,6-sialyltransferase variants may also be useful. Preferably such variants comprise a sequence identity of at least 80%, such as at least 85%, such as at least 90, such as at least 95%, such as at least 99% sequence identity to an α-2,6-sialyltransferase shown in table 12.

TABLE 12

List of α-2,6-sialyltransferases

| Protein Name | GenBank ID | Origin |
| --- | --- | --- |
| HAC1268 | STP03859.1 | Helicobacter acinonychis str. Sheeba |
| Pts6-119 | AB500947.1 | Photobacterium leiognathi JT-SHIZ-119 |

TABLE 12-continued

List of α-2,6-sialyltransferases

| Protein Name | GenBank ID | Origin |
|---|---|---|
| Pts6-224 | BAF92026.1 | *Photobacterium* sp JT-ISH-224 |
| PiST6_145 | BAF91416.1 | *Photobacterium leiognathi* |

The heterologous 2,6-sialyltransferase(s) may be used to produce e.g., 6'SL or Lst-c, or fucosylated variants thereof if combined with expression of an a fucosyltransferase.

Glycosyl-Donor—Nucleotide-Activated Sugar Pathways

The production of oligosaccharides is largely mediated by glycosyltransferases, which utilizes activated sugar nucleotide as donors for the glycosylation reactions.

An activated sugar nucleotide generally has a phosphorylated glycosyl residue attached to a nucleoside. A specific glycosyl transferase enzyme accepts only a specific sugar nucleotide. Thus, preferably the following activated sugar nucleotides are involved in the glycosyl transfer:glucose-UDP-GlcNAc, UDP-galactose, UDP-glucose, UDP-N-acetylglucosamine, UDP-N-acetylgalactosamine (GlcNAc) and CMP-N-acetylneuraminic acid.

The genetically engineered cell described herein can comprise one or more pathways to produce a nucleotide-activated sugar selected from the group consisting of glucose-UDP-GlcNAc, GDP-fucose, UDP-galactose, UDP-glucose, UDP-N-acetylglucosamine, UDP-N-acetylgalactosamine and CMP-N-acetylneuraminic acid.

In one embodiment of the current disclosure, the genetically engineered cell is capable of producing one or more activated sugar nucleotides mentioned above by a de novo pathway. In this regard, an activated sugar nucleotide is made by the cell under the action of enzymes involved in the de novo biosynthetic pathway of that respective sugar nucleotide in a stepwise reaction sequence starting from a simple carbon source like glycerol, sucrose, fructose or glucose (for a review for monosaccharide metabolism see e.g. H. H. Freeze and A. D. Elbein: *Chapter 4: Glycosylation precursors, in: Essentials of Glycobiology,* 2nd edition (Eds. A. Varki et al.), *Cold Spring Harbour Laboratory Press* (2009)).

The enzymes involved in the de novo biosynthetic pathway of an activated sugar nucleotide can be naturally present in the cell or introduced into the cell by means of gene technology or recombinant DNA techniques, all of them are parts of the general knowledge of the skilled person.

In another embodiment, the genetically engineered cell can utilize salvaged monosaccharides for sugar nucleotide. In the salvage pathway, monosaccharides derived from degraded oligosaccharides are phosphorylated by kinases, and converted to nucleotide sugars by pyrophosphorylases. The enzymes involved in the procedure can be heterologous ones, or native ones of the host cell.

β-Galactosidase

A host cell suitable for HMO production, e.g., *E. coli*, may comprise an endogenous β-galactosidase gene or an exogenous β-galactosidase gene, e.g., *E. coli* comprises an endogenous lacZ gene (e.g., GenBank Accession Number V00296 (Gl: 41901)). For the purposes of the present disclosure, when producing an HMO, it is preferred that the genetically engineered cell does not express a functional β-galactosidase to avoid the degradation of lactose if lactose is used as the initial substrate for producing the desired HMO. In embodiments the lacZ gene may be inactivated by a complete or partial deletion of the corresponding nucleic acid sequence from the bacterial genome, or the gene sequence is mutated in the way that it is not transcribed, or, if transcribed, the transcript is not translated or if translated to a protein (i.e., β-galactosidase), the protein does not have the corresponding enzymatic activity. In this way the HMO-producing bacterium accumulates an increased intracellular lactose pool which is beneficial for the production of HMOs.

Lactose Permease

Lactose permease is a membrane protein which is a member of the major facilitator superfamily and can be classified as a symporter, which uses the proton gradient towards the cell to transport β-galactosides such as lactose in the same direction into the cell. In oligosaccharide production, especially in the production of human milk oligosaccharides (HMOs), lactose is often the initial substrate being decorated to produce any HMO of interest in a bioconversion that happens in the cell interior. Thus, in the production of HMOs, there is a desire to be able to import lactose into the cell, e.g., by expression and/or overexpression of a lactose permease such as lacY of *E. coli* K.-12.

In embodiments, the lactose permease is as shown in SEQ ID NO: 9, or a functional homologue thereof having an amino acid sequence which is at least 80% identical, such as at least 85%, 90%, 95%, 98% or 99% identical to SEQ ID NO: 9.

In embodiments, the expression of the lactose permease is regulated by a promoter according to the present disclosure.

Transporter Proteins

The oligosaccharide product(s), such as the HMO produced by the cell, can be accumulated both in the intra- and the extracellular matrix. The product can be transported to the supernatant in a passive way, i.e., it diffuses outside across the cell membrane. The more complex HMO products may remain in the cell, which is likely to eventually impair cellular growth, thereby affecting the possible total yield of the product from a single fermentation. The HMO transport can be facilitated by major facilitator superfamily transporter proteins that promote the effluence of sugar derivatives from the cell to the supernatant. The major facilitator superfamily transporter can be present exogenously or endogenously and is overexpressed under the conditions of the fermentation to enhance the export of the oligosaccharide derivative (HMO) produced. The specificity towards the sugar moiety of the product to be secreted can be altered by mutation by means of known recombinant DNA techniques.

Thus, the genetically engineered cell according to the present disclosure can further comprise a nucleic acid sequence encoding a major facilitator superfamily transporter protein capable of exporting the fucosylated human milk oligosaccharide product or products, such a transporter protein can for example be a member of the major facilitator superfamily transporters.

In the resent years, several new and efficient major facilitator superfamily transporter proteins have been identified, each having specificity for different recombinantly produced HMOs and development of recombinant cells expressing said proteins are advantageous for high scale industrial HMO manufacturing.

Thus, in one or more exemplary embodiments, the genetically engineered cell according to the present disclosure further comprises a gene product that acts as an oligosaccharide transporter. The gene product that acts as an oligosaccharide transporter may be encoded by a recombinant nucleic acid sequence that is expressed in the genetically engineered cell. The recombinant nucleic acid sequence encoding the oligosaccharide transporter, may be integrated into the genome of the genetically engineered cell, or expressed using a plasmid.

In one embodiment, the genetically engineered cell of the present disclosure comprises a nucleic acid sequence encoding a major facilitator superfamily transporter protein capable of exporting the product oligosaccharide(s) into the extracellular medium, in particular, the transporters with specificity towards exporting HMOs, with a lacto-N-triose II (LNT-II) core structure such as LNT, LNnT and derivates thereof, are preferred.

Nec

In embodiments, the genetically engineered cell described herein comprises a nucleic acid sequence encoding an efflux transporter protein capable of exporting the produced oligosaccharide(s), such as LNT and/or LNnT; into the extracellular medium. In the current context, said efflux transporter protein is preferably a heterologous gene encoding a putative MFS (major facilitator superfamily) transporter protein, originating from the bacterium *Rosenbergiella nectarea*. More specifically, the present disclosure relates to a genetically engineered cell optimized to produce an oligosaccharide, in particular an oligosaccharide with a lacto-N-triose II (LNT-II) core structure, such as e.g., LNT, which comprises a recombinant nucleic acid encoding a protein having at least 80%, such as at least 85%, such as at least 90% such as at least 95% or 100% sequence identity to the amino acid sequence of the amino acid sequence according to SEQ ID NO: 5 and GenBank accession ID WP_092672081.1.

Additionally, the MFS transporter protein of SEQ ID NO: 5 and the GenBank accession ID WP_092672081.1 is further described in WO2021/148615 and is identified herein as "Nec protein" or "Nec transporter" or "Nec", interchangeably; a nucleic acid sequence encoding Nec protein is identified herein as "nec coding nucleic acid/DNA" or "nec gene" or "nec".

Nec is expected to facilitate an increase in the efflux of the produced oligosaccharide(s), e.g., LNT, in the genetically engineered cells of the current disclosure.

Vag

An alternative MFS transporter protein is identified herein as "Vag protein" or "Vag transporter" or "Vag", interchangeably, has an amino acid sequence corresponding the GenBank accession ID WP_048785139.1.

In one or more embodiment(s) of the invention, the genetically engineered cell expresses the heterologous MFS transporter protein vag or a functional homologue thereof, having an amino acid sequence which is at least 80%, such as at least 90%, such as at least 95%, such as at least 99%, such as 100% identical to the amino acid sequence of the GenBank accession ID WP_048785139.1.

Vag is expected to facilitate an increase in the efflux of the produced oligosaccharide(s), e.g., LNnT, in the genetically engineered cells of the current disclosure.

YberC

A further alternative MFS transporter protein is identified herein as "YberC protein" or "YberC transporter" or "YberC", interchangeably, has an amino acid sequence corresponding the GenBank accession ID EEQ08298.1.

In one or more embodiment(s) of the invention, the genetically engineered cell expresses the heterologous MFS transporter protein YberC or a functional homologue thereof, having an amino acid sequence which is at least 80%, such as at least 90%, such as at least 95%, such as at least 99%, such as 100% identical to the amino acid sequence of the GenBank accession ID EEQ08298.1.

Vag is expected to facilitate an increase in the efflux of the produced oligosaccharide(s), e.g., LNT or LNnT, in the genetically engineered cells of the current disclosure.

The Genetically Engineered Cell

As used herein "a genetically engineered cell" is a cell whose genetic material has been altered by human intervention using a genetic engineering technique, such a technique is for example but not limited to transformation or transfection e.g., with a heterologous polynucleotide sequence, Crisper/Cas editing and/or random mutagenesis. In one embodiment the genetically engineered cell has been transformed or transfected with a recombinant nucleic acid sequence.

The genetically engineered cell is preferably a prokaryotic cell, such as a microbial cell, preferably, a bacterial cell. In one preferred embodiment, the genetically engineered cell is a bacterial cell, preferably a gram-negative bacterium.

Host Cells

In embodiments, the engineered cell is a microorganism. The genetically engineered cell is preferably a microbial cell, such as a prokaryotic cell e.g., a bacterial cell.

The genetically engineered cell may be e.g., a bacterial cell.

In relation to the bacterial host cells, there are, in principle, no limitations; but preferably, the bacterial host cell is a gram-negative cell, provided that such a cell allows for genetic manipulation e.g., by insertion of a gene of interest and that the cell can be cultivated on a manufacturing scale. Preferably, the host cell has the property to allow cultivation to high cell densities. Non-limiting examples of bacterial host cells that are suitable for recombinant industrial production of oligosaccharides(s) according to the present disclosure could be member of the Enterobacterales order, preferably of the genus *Escherichia* sp., *Klebsiella* sp., *Salmonella* sp. or *Shigella* sp.

Other examples of suitable gram-negative host cells are host cell are *Bdellovibrio* sp., *Campylobacter* sp., *Citrobacter* sp. (such as *Citrobacter freundii*), *Erwinia* sp. (such as *Erwinia herbicola*) *Haemophilus* sp, *Helicobacter* sp., *Legionella* sp, *Moraxella* sp, *Neisseria* sp, *Pantoea* sp. (such as *Pantoea agglomerans*), *Pantoea* sp. (such as *Pantoea citrea*), *Pectobacterium* sp. (such as *Pectobacterium carotovorum*), *Pseudomonas* sp., *Stenotrophomonas* sp., *Xanthomonas* sp. (such as *Xanthomonas campestris*).

In one or more exemplary embodiments, the genetically engineered cell is selected from the group consisting of *Escherichia coli*.

Preferably, the genetically engineered cell is gram-negative bacteria.

In one or more exemplary embodiments, the genetically engineered cell is *Escherichia coli*.

In one or more exemplary embodiments, the present disclosure relates to a genetically engineered cell, wherein the cell is derived from the *E. coli* K-12 strain or DE3.

A Recombinant Nucleic Acid Sequence

In the present context, the term "recombinant nucleic acid sequence", "recombinant gene/nucleic acid/nucleotide sequence/DNA encoding" or "coding nucleic acid sequence" is used interchangeably and intended to mean an artificial nucleic acid sequence (i.e. produced in vitro using standard laboratory methods for making nucleic acid sequences) that comprises a set of consecutive, non-overlapping triplets (codons) which is transcribed into mRNA and translated into a protein when under the control of the appropriate control sequences, i.e., a promoter sequence.

The boundaries of the coding sequence are generally determined by a ribosome binding site located just upstream of the open reading frame at the 5'end of the mRNA, a transcriptional start codon (AUG, GUG or UUG), and a translational stop codon (UAA, UGA or UAG). A coding sequence can include, but is not limited to, genomic DNA, cDNA, synthetic, and recombinant nucleic acid sequences.

The term "nucleic acid" includes RNA, DNA and cDNA molecules. It is understood that, as a result of the degeneracy of the genetic code, a multitude of nucleic acid sequences encoding a given protein may be produced.

The recombinant nucleic acid sequence may be a coding DNA sequence e.g., a gene, or non-coding DNA sequence e.g., a regulatory DNA, such as a promoter sequence or other non-coding regulatory sequences.

The recombinant nucleic acid sequence may in addition be heterologous. As used herein "heterologous" refers to a polypeptide, amino acid sequence, nucleic acid sequence or nucleotide sequence that is foreign to a cell or organism, i.e., to a polypeptide, amino acid sequence, nucleic acid molecule or nucleotide sequence that does not naturally occurs in said cell or organism.

The present disclosure also includes nucleic acid constructs comprising a coding nucleic sequence, i.e. recombinant DNA sequence of a gene of interest, e.g., a glycosyltransferase, and a non-coding regulatory DNA sequence, e.g., a promoter DNA sequence, e.g., a recombinant promoter sequence derived from the promoter sequence of the lac operon or the glp operon, or a promoter sequence derived from another genomic promoter DNA sequence, or a synthetic promoter sequence, wherein the coding and promoter sequences are operably linked. Examples of such constructs are e.g., the construct comprising PglpF-galTK, PglpF-galT, or PglpF-lgtA.

The term "operably linked" refers to a functional relationship between two or more nucleic acid (e.g., DNA) segments. It refers to the functional relationship of a transcriptional regulatory sequence to a transcribed sequence. E.g., a promoter sequence is operably linked to a coding sequence if it stimulates or modulates the transcription of the coding sequence in an appropriate host cell or other expression system.

Generally, promoter sequences that are operably linked to a transcribed sequence are physically contiguous to the transcribed sequence, i.e., they are cis-acting.

In one exemplified embodiment, the nucleic acid construct of the present disclosure may be a part of the vector DNA, in another embodiment, the construct it is an expression cassette/cartridge that is integrated in the genome of a host cell.

Accordingly, the term "nucleic acid construct" means an artificially constructed segment of nucleic acids, in particular a DNA segment, which is intended to be inserted into a target cell, e.g., a bacterial cell, to modify expression of a gene of the genome or expression of a gene/coding DNA sequence which may be included in the construct.

Integration of the nucleic acid construct of interest comprised in the construct (expression cassette) into the bacterial genome can be achieved by conventional methods, e.g. by using linear cartridges that contain flanking sequences homologous to a specific site on the chromosome, as described for the attTn7-site (Waddell C. S. and Craig N. L., Genes Dev. (1988) February; 2 (2): 137-49.); methods for genomic integration of nucleic acid sequences in which recombination is mediated by the Red recombinase function of the phage A or the RecE/RecT recombinase function of the Rac prophage (Murphy, J Bacteriol. (1998); 180 (8): 2063-7; Zhang et al., Nature Genetics (1998) 20:123-128 Muyrers et al., EMBO Rep. (2000) 1 (3): 239-243); methods based on Red/ET recombination (Wenzel et al., Chem Biol. (2005), 12 (3): 349-56.; Vetcher et al., Appl Environ Microbiol. (2005); 71 (4): 1829-35); or positive clones, i.e., clones that carry the expression cassette, can be selected e.g., by means of a marker gene, or loss or gain of gene function.

Preferably, the heterologous elements, e.g., the glycosyltransferase or transporter encoding sequence is under the control of a promoter sequence selected from promotor sequences with a nucleic acid sequence as identified in Table 3.

TABLE 3

Selected promoter sequences

| Promoter name | % Activity relative to PglpF* | Strength | Reference | Seq ID in appl. |
|---|---|---|---|---|
| PmglB_70UTR_SD8 | 291% | high | WO2020255054 | 10 |
| PmglB_70UTR_SD10 | 233-281% | high | WO2020255054 | 11 |
| PmglB_54UTR | 197% | high | WO2020255054 | 12 |
| Plac_70UTR | 182-220% | high | WO2019123324 | 13 |
| PmglB_70UTR_SD9 | 180-226% | high | WO2020255054 | 14 |
| PmglB_70UTR_SD4 | 153%-353% | high | WO2020255054 | 15 |
| PmglB_70UTR_SD5 | 146-152% | high | WO2020255054 | 16 |
| PglpF_SD4 | 140-161% | high | WO2019123324 | 17 |
| PmglB_70UTR_SD7 | 127-173% | high | WO2019123324 | 18 |
| PmglB_70UTR | 124-234% | high | WO2020255054 | 19 |
| PglpA_70UTR | 102-179% | high | WO2019123324 | 20 |
| PglpT_70UTR | 102-240% | high | WO2019123324 | 21 |
| PglpF | 100% | high | WO2019123324 | 22 |
| PglpF_SD10 | 88-96% | high | WO2019123324 | 23 |
| PglpF_SD5 | 82-91% | high | WO2019123324 | 24 |
| PglpF_SD8 | 81-82% | high | WO2019123324 | 25 |
| PmglB_16UTR | 78-171% | high | WO2019123324 | 26 |
| PglpF_SD9 | 73-93% | middle | WO2019123324 | 27 |
| PglpF_SD7 | 47-57% | middle | WO2019123324 | 28 |
| PglpF_SD6 | 46-47% | middle | WO2019123324 | 29 |
| PglpA_16UTR | 38-64% | middle | WO2019123324 | 30 |
| Plac_wt* | 15-28% | low | WO2019123324 | 31 |
| PglpF_SD3 | 9% | low | WO2019123324 | 32 |

TABLE 3-continued

Selected promoter sequences

| Promoter name | % Activity relative to PglpF* | Strength | Reference | Seq ID in appl. |
|---|---|---|---|---|
| PglpF_SD1 | 5% | low | WO2019123324 | 33 |
| Pscr | — | — | — | 34 |

*The promoter activity is assessed in the LacZ assay described below with the PglpF promoter run as positive reference in the same assay. To compare across assays the activity is calculated relative to the PglpF promoter, a range indicates results from multiple assays.

The promoter may be of heterologous origin, native to the genetically engineered cell or it may be a recombinant promoter, combining heterologous and/or native elements.

One way to increase the production of a product may be to regulate the production of the desired enzyme activity used to produce the product, such as the glycosyltransferases or enzymes involved in the biosynthetic pathway of the glycosyl donor.

Increasing the promoter strength driving the expression of the desired enzyme may be one way of doing this. The strength of a promoter can be assessed using a lacZ enzyme assay where β-galactosidase activity is assayed as described previously (see e.g., Miller J. H. *Experiments in molecular genetics*, Cold spring Harbor Laboratory Press, NY, 1972). Briefly the cells are diluted in Z-buffer and permeabilized with sodium dodecyl sulfate (0.1%) and chloroform. The LacZ assay is performed at 30° C. Samples are preheated, the assay initiated by addition of 200 µl ortho-nitro-phenyl-β-galactosidase (4 mg/ml) and stopped by addition of 500 µl of 1 M $Na_2CO_3$ when the sample had turned slightly yellow. The release of ortho-nitrophenol is subsequently determined as the change in optical density at 420 nm. The specific activities are reported in Miller Units (MU) [A420/(min*ml*A600)]. A regulatory element with an activity above 10,000 MU is considered strong and a regulatory element with an activity below 3,000 MU is considered weak, what is in between has intermediate strength. An example of a strong regulatory element is the PglpF promoter with an activity of approximately 14.000 MU and an example of a weak promoter is Plac which when induced with IPTG has an activity of approximately 2300 MU. In preferred embodiments, the expression of said nucleic acid sequences are under control of a strong promoter selected from the group consisting of SEQ ID NOs 10, 11, 12, 13, 14, 15, 16, 18 and 19.

In embodiments the expression of said nucleic acid sequences described herein is under control of a PglpF (SEQ ID NO: 22 or Plac (SEQ ID NO: 31) promoter or PmglB_UTR70 (SEQ ID NO: 19) or PglpA_70UTR (SEQ ID NO: 20) or PglpT_70UTR (SEQ ID NO: 21) or variants thereof such as promoters identified in Table 3, in particular the PglpF_SD4 variant of SEQ ID NO: 17 or Plac_70UTR variant of SEQ ID NO: 13, or PmglB_70UTR variants of SEQ ID NO: 10, 11, 12, 13, 14, 15, 16, 18 and 19. Further suitable variants of PglpF, PglpA_70UTR, PglpT_70UTR and PmglB_70UTR promoter sequences are described in or WO2019/123324 and WO2020/255054 respectively (hereby incorporated by reference).

In preferred embodiments, the recombinant nucleic acid sequences individually are under the control of one or more promoters selected from the group consisting of PglpF, Plac, PmglB_70UTR, PglpA_70UTR and PglpT_70UTR (SEQ ID NOs: 22, 31, 19, 20 and 21 respectively) and variants thereof.

Sequence Identity

The term "sequence identity" as used herein describes the relatedness between two amino acid sequences or between two nucleotide sequences, i.e., a candidate sequence (e.g., a sequence of the disclosure) and a reference sequence (such as a prior art sequence) based on their pairwise alignment. For purposes disclosed herein, the sequence identity between two amino acid sequences is determined using the Needleman-Wunsch algorithm (Needleman and Wunsch, 1970, J. Mo/. Biol. 48:443-453) as implemented in the Needle program of the EMBOSS package (EMBOSS: The European Molecular Biology Open Software Suite, Rice et al., 2000, Trends Genet. 16:276-277), preferably version 5.0.0 or later (available at www.ebi.ac.uk/Tools/psa/emboss_needle/). The parameters used are gap open penalty of 10, gap extension penalty of 0.5,-endopen 10.0,-endextend 0.5 and the EBLOSUM62 (EMBOSS version of BLOSUM62) substitution matrix. The output of Needle labelled "identity" (obtained using the-nobrief option) is used as the percent identity. Generally sequence identity may be calculated as follows: (Identical Residues×100)/(aligned region).

For purposes disclosed herein, the sequence identity between two nucleotide sequences is determined using the Needleman-Wunsch algorithm (Needleman and Wunsch, 1 970, supra) as implemented in the Needle program of the EMBOSS package (EMBOSS: The European Molecular Biology Open Software Suite, Rice et al., 2000, Trends Genet. 16:276-277), 10 preferably version 5.0.0 or later. The parameters used are gap open penalty of 10, gap extension penalty of 0.5,-endopen 10.0,-endextend 0.5 and the DNA-FULL (EMBOSS version of NCBI NUC4.4) substitution matrix. The output of Needle labelled "identity" (obtained using the-nobrief option) is used as the percent identity. Generally sequence identity may be calculated as follows: (Identical nucleotide residues×100)/(aligned region).

Functional Homologue

A functional homologue or functional variant of a protein/nucleic acid sequence as described herein is a protein/nucleic acid sequence with alterations in the genetic code, which retain its original functionality. A functional homologue may be obtained by mutagenesis or may be natural occurring variants from the same or other species. The functional homologue should have a remaining functionality of at least 50%, such as at least 60%, 70%, 80%, 90% or at least 100%, or more, compared to the functionality of the protein/nucleic acid sequence.

In relation to the modification of the osmoregulated periplasmic glucan (OPG) biosynthetic machinery in the cell as described herein, total loss of function is understood as a total loss of enzyme activity, e.g. by deletion of the nucleic acid encoding the enzyme, or by introduction of a stop codon that terminate transcription of the nucleic acid encoding the enzyme at a position that does not allow for the formation of a functional enzyme. Decreased function is understood as a reduction in enzyme functionality following genetic modification, where the functionality is reduced sufficiently to avoid significant formation of by-product oligosaccharide(s) in a genetically modified cell capable of producing one or more desired oligosaccharides, such as HMOs. The decreased function of an OPG enzyme can be assessed by measuring the ability of the enzyme to decorate LNT or LNnT compared to the unmodified enzyme. Preferably, the ability to decorate LNT and/or LNnT is reduced by at least 50% such as at least 60%, 70%, 80%, 90% or at least 95% as compared to the unmodified enzyme.

Use of a Genetically Engineered Cell

The present disclosure also relates to the use of a genetically engineered cell as described herein in the production of an oligosaccharide product, in particular a heterologous oligosaccharide product which is separated/purified from the genetically engineered producing it.

Preferably, the oligosaccharide product is one or more human milk oligosaccharides (HMOs) with a lacto-N-triose II (LNT-II) core structure, such as e.g., an HMO selected from the group consisting of LNT, LNnT, LNT-II, LNFP-I, LNFP-II, LNFP-III, LNFP-V, LNFP-VI, LNDFH-I, LNDFH-II, LNDFH-III, pLNH, F-pLNH I, pLNnH, LST a, LST b, LST c, DSLNT. The use of such cell should entail a lower production of by-products such as e.g., phosphoglycerol-oligosaccharide(s) and/or phosphoethanolamine-oligosaccharide(s).

a Method for Producing One or More Oligosaccharides

The present disclosure also relates to a method for producing one or more desired oligosaccharides, in particular one or more heterologous oligosaccharides, said method comprises culturing a genetically engineered cell according to the present disclosure.

An second aspect of the present disclosure is a method for producing an oligosaccharide product, in particular a heterologous oligosaccharide product, wherein said method comprises,
a) providing a genetically engineered cell according to the present disclosure,
b) cultivating the genetically engineered cell in a culture medium under conditions permissive for the production of said oligosaccharide product; and optionally
c) recovering said oligosaccharide product from the culture.

A "desired oligosaccharide(s)" or "product oligosaccharide(s)" is to be understood as the oligosaccharide(s) intentionally produced by the method, i.e., the primary product(s) to be obtained from the method. The desired oligosaccharide(s) may be a single oligosaccharide e.g., the HMO LNT, or it may be a mixture of oligosaccharide(s) such as e.g., a mixture comprising the HMOs LNT-II, LNT and LNFP-I. By-products may be seen as unwanted products produced by the method, such as e.g., phosphoethanolamine modified oligosaccharides and/or glycerophosphate modified oligosaccharides and/or succinyl modified oligosaccharides, or it may be intermediate oligosaccharide products such as e.g., LNT-II, or elongated oligosaccharide products, such as pLNH-II.

One of the benefits of producing one or more oligosaccharides using a method as disclosed herein, is the absence of phosphoethanolamine and/or a glycerophosphate and/or succinyl modified oligosaccharides, which allows for a cleaner production of the desired oligosaccharide(s). This is exemplified in example 1, where the desired oligosaccharide is LNT, and the phosphoethanolamine and/or a glycerophosphate modified oligosaccharides are the LNT derivates phosphoethanolamine-LNT (EP-LNT) and glycerophosphate-LNT (GP-LNT). Following cultivation of a cell of the present disclosure, it was shown that the cell was capable of producing LNT without producing the by-products EP-LNT and GP-LNT. In addition, it was found that the cultivation of the cell resulted in an almost identical yield of LNT, compared to the strain with functional opgB and opgE genes.

Accordingly, the present application also relates to a method for producing a desired oligosaccharide product, wherein said method comprises, providing a genetically engineered cell which is capable of producing or produces the desired oligosaccharide product and has decreased or total loss of function of phosphoglycerol transferase I and II and/or phosphoethanolamine transferase and/or OPG biosynthesis protein C, cultivating the genetically engineered cell in a culture medium under conditions permissive for the production of said oligosaccharide product; and optionally, recovering said oligosaccharide product. Preferably, the phosphoglycerol transferase I and II is encoded by the opgB gene. Preferably, the phosphoethanolamine transferase is encoded by the opgE gene. Preferably, the OPG biosynthesis protein C is encoded by the opgC gene.

It is preferred that the production of the desired oligosaccharide is not reduced by more than 15%, preferably not by more than 10%, preferably not substantially affected, when compared to a method comprising cultivating a cell which does not have a decreased or total loss of function of a phosphoglycerol transferase I and II and/or a phosphoethanolamine transferase and/or OPG biosynthesis protein C.

As is also indicated in example 2, the yield of the production of the desired oligosaccharide LNnT may also be increased upon deletion of key enzymes of the osmoregulated periplasmic glucan biosynthetic machinery, e.g., OpgB and OpgE, supposably due to a decrease in energy expenditure of the cell.

In preferred embodiments, the production of the desired oligosaccharide(s) according to the methods disclosed herein, may even be increased by at least 5%, such as at least 10%, such as at least 15%, such as at least 20%, compared to a method comprising cultivating a cell, which does not have a decreased, or total loss of function of the phosphoglycerol transferase I and II and/or the phosphoethanolamine transferase and/or the OPG biosynthesis protein C.

In addition, a reduced amount of by-product oligosaccharides comprising a phosphoethanolamine- and/or glycerophosphate- and/or succinyl-moiety is produced by the method, as compared to a method using a cell containing the phosphoglycerol transferase I and II and/or the phosphoethanolamine transferase and/or OPG biosynthesis protein C, such as the by-product is phosphoglycerol-LNT and/or phosphoethanolamine-LNT and/or succinyl-LNT, or phosphoglycerol-LNnT and/or phosphoethanolamine-LNnT and/or succinyl-LNnT.

In embodiments, the desired oligosaccharide is one or more human milk oligosaccharides (HMOs) selected from the group consisting of LNT, LNnT, LNT-II, LNFP-I, LNFP-II, LNFP-III, LNFP-V, LNFP-VI, LNDFH-I, LNDFH-II, LNDFH-III, pLNH, F-pLNH I, pLNnH, LST a, LST b, LST c, DSLNT. Preferably, the HMO is LNT, LNnT or LNFP-I.

The benefits of the methods disclosed herein is a reduction in the amount of phosphoethanolamine and/or a glycerophosphate modified oligosaccharides produced by the cell. Accordingly, in embodiments, the ratio (w/w) of desired oligosaccharide:phosphoglycerol-oligosaccharide produced in the culturing step according to said method is at least 500:1, such as at least 750:1, 1000:1, 2000:1 or such at least 5000:1 and/or the ratio (w/w) of desired oligosaccharide:phosphoethanolamine-oligosaccharide is at least 50:1, such as at least 100:1, 300:1, 500:1 or such at least 1000:1.

In preferred embodiments, the ratio (w/w) of LNT:phosphoglycerol-LNT produced in the culturing step according to said method is at least 500:1, such as at least 750:1, 1000:1, 2000:1 or such at least 5000:1. In further embodiments, the ratio (w/w) of LNT:phosphoethanolamine-LNT is at least 50:1, such as at least 100:1, 300:1, 500:1 or such at least 1000:1.

Accordingly, in a method for producing LNT it highly preferable less than 0.2%, such as less than 0.1%, 0.05%, 0.01%, 0.005%, or less than 0.001% (mass %) phosphoethanolamine-LNT relative to the amount of LNT, is produced. In addition to is also highly preferably, that less than 2.6%, such as less than 2%, 1.5%, 1%, 0.5%, 0.1%, 0.05% or such as less than 0.01% (mass %) of glycerophospho-LNT relative to the amount of LNT, is produced.

Preferably, no glycerophospho-LNT and/or phosphoethanolamine-LNT is produced.

Further genetic modifications can e.g., be selected from inclusion of additional glycosyltransferases and/or metabolic pathway engineering, and inclusion of transporters, such as substrate importers or product exporters, such as MFS transporters, as described in the above sections, which the skilled person will know how to combine into a genetically engineered cell capable of producing one or more oligosaccharides.

The method comprising culturing a genetically engineered cell and further comprises culturing said genetically engineered cell in in the presence of an energy source (carbon source) selected from the group consisting of glucose, sucrose, fructose, xylose and glycerol.

In one aspect, the method of the present disclosure comprises providing an acceptor saccharide as initial substrate for the oligosaccharide, such as HMO formation. In one embodiment the acceptor saccharide comprising at least two monosaccharide units, which is exogenously added to the culture medium and/or has been produced by a separate microbial fermentation. As an alternative to adding the initial substrate to the fermentation medium, the genetically modified cell may be further engineered to produce the initial substrate inside the cell (see for example WO2015/150328). Preferably, the acceptor saccharide is lactose, or alternatively LNT-II.

In embodiments the substrate for HMO formation is lactose which is fed to the culture during the fermentation of the genetically engineered cell. Preferably, the initial substrate is lactose and/or LNT-II and is added during the cultivation of the genetically engineered cells as a substrate for the HMO formation.

The desired oligosaccharide, such as the desired HMO, may be retrieved from the culture, either from the culture medium and/or the genetically engineered cell.

Culturing/Fermenting

Culturing, cultivating, or fermenting or fermentation (used interchangeably herein) in a controlled bioreactor typically comprises (a) a first phase of exponential cell growth in a culture medium ensured by a carbon-source, and (b) a second phase of cell growth in a culture medium run under carbon limitation, where the carbon-source is added continuously together with the acceptor oligosaccharide, such as lactose, allowing formation of the HMO product in this phase. By carbon (sugar) limitation is meant the stage in the fermentation where the growth rate is kinetically controlled by the concentration of the carbon source (sugar) in the culture broth, which in turn is determined by the rate of carbon addition (sugar feed-rate) to the fermenter.

The terms "manufacturing" or "manufacturing scale" or "large-scale production" or "large-scale fermentation", are used interchangeably and in the meaning of the present disclosure defines a fermentation with a minimum volume of 100 L, such as 1000 L, such as 10.000 L, such as 100.000 L, such as 200.000 L culture broth. Usually, a "manufacturing scale" process is defined by being capable of processing large volumes yielding amounts of the oligosaccharide product, such as the HMO product, of interest that meet, e.g., in the case of a therapeutic compound or composition, the demands for toxicity tests, clinical trials as well as for market supply. In addition to the large volume, a manufacturing scale method, as opposed to simple lab scale methods like shake flask cultivation, is characterized by the use of the technical system of a bioreactor (fermenter) which is equipped with devices for agitation, aeration, nutrient feeding, monitoring and control of process parameters (pH, temperature, dissolved oxygen tension, back pressure, etc.). To a large extent, the behaviour of an expression system in a lab scale method, such as shake flasks, benchtop bioreactors or the deep well format described in the examples of the disclosure, does allow to predict the behaviour of that system in the complex environment of a bioreactor.

With regards to the suitable cell medium used in the fermentation process, there are no limitations. The culture medium may be semi-defined, i.e., containing complex media compounds (e.g., yeast extract, soy peptone, casamino acids, etc.), or it may be chemically defined, without any complex compounds. The carbon-source can be selected from the group consisting of glucose, sucrose, fructose, galactose, maltose, xylose and glycerol or alternative carbon sources. In one or more exemplary embodiments, the culturing media is supplemented with one or more energy and carbon sources selected form the group containing glycerol, sucrose and glucose. In additional embodiments, lactose is added during the cultivation of the genetically engineered cells as a substrate for the oligosaccharide formation.

In one or more embodiments, the culturing media contains sucrose as the sole carbon and energy source. In further embodiments, at least one energy source is added to the culture medium. In embodiments, the at least one energy source is preferably selected from the group consisting of glucose, sucrose, fructose, galactose, maltose, xylose, glycerol and combinations thereof. In one or more exemplary embodiments, the genetically engineered cell comprises one or more heterologous nucleic acid sequence encoding one or more heterologous polypeptide(s) which enables utilization of sucrose as sole carbon and energy source of said genetically engineered cell.

In embodiments, the precursor molecule (initial substrate) for the synthesis of the desired oligosaccharides is added during the cultivation of the genetically engineered cells as a substrate for the oligosaccharide formation. In further embodiments, lactose and/or LNT-II is added during the cultivation of the genetically engineered cells as a substrate for the formation of the desired oligosaccharides(s).

In one or more embodiments, the genetically engineered cell comprises a PTS-dependent sucrose utilization system, further comprising the scrYA and scrBR operons as described in WO2015/197082 (hereby incorporated by reference).

The method according to the present disclosure comprises cultivating the genetically engineered bacterial cell in a culture medium which is designed to support the growth of microorganisms, and which contains one or more carbohydrate sources, or just carbon-source, such as one or more carbon source(s) selected from the group consisting of glucose, sucrose, fructose, galactose, maltose, xylose and glycerol, or an alternative carbon-source.

Retrieving/Harvesting

In the present context, the term "retrieving" is used interchangeably with the term "harvesting". Both "retrieving" and "harvesting" in the context relate to collecting the produced oligosaccharides(s) from the culture/broth following the termination of fermentation. In one or more exemplary embodiments it may include collecting the oligosaccharides(s) included in both the biomass (i.e., the host cells) and cultivation media, i.e., before/without separation of the fermentation broth from the biomass, i.e. the cells are lysed to release the oligosaccharide content into the broth at the end of fermentation before removing the biomass. In other embodiments, the produced oligosaccharides may be collected separately from the biomass and fermentation broth, i.e., after/following the separation of biomass from cultivation media (i.e., fermentation broth).

The separation of cells from the medium can be carried out with any of the methods well known to the skilled person in the art, such as any suitable type of centrifugation or filtration. The separation of cells from the medium can follow immediately after harvesting the fermentation broth or be carried out at a later stage after storing the fermentation broth at appropriate conditions. Recovery of the produced oligosaccharide(s) from the remaining biomass (or total fermentation broth) include extraction thereof from the biomass (i.e., the production cells).

After recovery from fermentation, oligosaccharides(s) are available for further processing and purification.

The oligosaccharides can be purified according to the procedures known in the art, e.g., such as described in WO2017/182965. The purified oligosaccharides can be used as nutraceuticals, pharmaceuticals, or for any other purpose, e.g., for research.

Manufactured Product

The term "manufactured product" refers to the one or more oligosaccharide(s) intended as the one or more product oligosaccharides, such as an HMO with a LNT-II core, or composition of a mixture of oligosaccharides. Preferably, the product oligosaccharide(s) is produced by a method described herein using a genetically engineered cell described herein. In preferred embodiments, the manufactured product is LNT or LNnT or LNFP-I or LNT and LNFP-I. Accordingly, the present disclosure also relates to an oligosaccharide produced by the method described herein. In example, it is shown in Examples 1 that the level of the by-product phosphoglycerol-LNT and phosphoethanolamine-LNT can be abolished when LNT is produced as describe in the present disclosure.

Accordingly, it would be possible to distinguish oligosaccharides, such as e.g., LNT, produced according to the present method, from oligosaccharides such as e.g., LNT, produced by another method where phosphoglycerol-oligosaccharides, such as e.g., phosphoglycerol-LNT and phosphoethanolamine-oligosaccharides, such as e.g., phosphoethanolamine-LNT, could be present.

The manufactured product may be a powder, a composition, a liquid, a suspension, or a gel comprising one or more oligosaccharides.

SEQUENCES

The current application contains a sequence listing in text format and electronic format which is hereby incorporated by reference.

An overview of the sequences described in the application can be found in table 4, and additionally promoter sequences used in the present application can be found in table 3 (promoter sequences SEQ ID NO: 10-34).

TABLE 4

Sequences

| Protein/construct/gene name | Type | Origin | Seq ID in appl. |
| --- | --- | --- | --- |
| opgB | DNA | E. coli | 1 |
| opgE | DNA | E. coli | 2 |
| Phosphoglycerol transferase I (OpgB) | AA | E. coli | 3 |
| Phosphoethanolamine transferase (OpgE) | AA | E. coli | 4 |
| opgC | DNA | E. coli | 35 |
| OPG biosynthesis protein C (OpgC) | AA | E. coli | 36 |
| Nec | AA | R. nectarea | 5 |
| LgtA | AA | Neisseria meningitidis | 6 |
| GalTK | AA | Helicobacter pylori | 7 |
| GalT | AA | Helicobacter pylori | 8 |
| LacY | AA | E. coli | 9 |

EXAMPLES

Methods

Unless stated otherwise, standard techniques, vectors, control sequence elements, and other expression system elements known in the field of molecular biology are used for nucleic acid manipulation, transformation, and expression. Such standard techniques, vectors, and elements can be found, e.g., in: Ausubel et al. (eds.), *Current Protocols in Molecular Biology* (1995) (John Wiley & Sons); Sambrook, Fritsch, & Maniatis (eds.), *Molecular Cloning* (1989) (Cold Spring Harbor Laboratory Press, NY); Berger & Kimmel, *Methods in Enzymology* 152: Guide to Molecular Cloning Techniques (1987) (Academic Press); Bukhari et al. (eds.), *DNA Insertion Elements, Plasmids and Episomes* (1977) (Cold Spring Harbor Laboratory Press, NY); Miller, J. H. Experiments in molecular genetics (1972.) (Cold spring Harbor Laboratory Press, NY)

The examples described below are selected to illustrate the invention and are not limiting the invention in any way.

Strains

The strains (genetically engineered cells) constructed in the present application were based on *Escherichia coli* K-12 DH1 with the genotype: F−, λ−, gyrA96, recA1, relA1, endA1, thi-1, hsdR17, supE44. Additional modifications were made to the *E. coli* K-12 DH1 strain to generate the MDO strain with the following modifications: lacZ: deletion of 1.5 kbp, lacA: deletion of 0.5 kbp, nanKETA: deletion of 3.3 kbp, melA: deletion of 0.9 kbp, wcaJ: deletion of 0.5 kbp, mdoH: deletion of 0.5 kbp, and insertion of Plac promoter upstream of the gmd gene. This strain serves as the MDO background strain.

Methods of inserting or deleting gene(s) of interest into the genome of *E. coli* are well known to the person skilled in the art. Insertion of genetic cassettes into the *E. coli* chromosome can be done using gene gorging (see e.g., Herring and Blattner 2004 J. Bacteriol. 186:2673-81 and Warming et al 2005 Nucleic Acids Res. 33 (4): e36) with specific selection marker genes and screening methods.

To obtain an LNT producing strain the MDO strain was further engineered by chromosomally integrating a beta-1, 3-GlcNAc transferase (LgtA from *Neisseria meningitidis*, homologous to NCBI Accession nr. WP_033911473.1 and as shown in SEQ ID NO: 6) and a beta-1,3-galactosyltransferase (GalTK from *Helicobacter pylori*, homologous to GenBank Accession nr. BD182026.1 and as shown in SEQ ID NO: 7) both under the control of a PglpF promoter (SEQ ID NO: 22). Furthermore, the strain was supplemented with a MFS transporter to export LNT out of the cell, this strain is named the LNT strain (MP0 in table 5 below).

To obtain an LNnT producing strain by chromosomally integrating a beta-1,3-GlcNAc transferase (LgtA from *Neisseria meningitidis*, homologous to NCBI Accession nr. WP_033911473.1 and shown as SEQ ID NO: 6) and a beta-1,4-galactosyltransferase (GalT from *Helicobacter pylori*, homologous to GenBank ID WP_001262061.1 and shown as SEQ ID NO: 8) both under the control of a PglpF promoter (SEQ ID NO: 22). To increase the LNnT production and export from the cell, strain was supplemented with a MFS transporter, this strain is named the LNnT strain (MP2 in table 5 below).

The LNT and LNnT strains were further engineered by deletion of the endogenous genes opgE (SEQ ID NO: 1) and opgB (SEQ ID NO: 2) (MP1 and MP3, respectively in table 5 below).

The genotypes of the background strain (MDO), and the LNT and LNnT producing strains, MP0, MP1, MP2 and MP3, are provided in Table 5.

supplemented with magnesium sulphate (0.12 g/L), thiamine (0.004 g/L) and glucose (5.5 g/L). Basal Minimal medium had the following composition: NaOH (1 g/L), KOH (2.5 g/L), KH$_2$PO$_4$ (7 g/L), NH$_4$H$_2$PO$_4$ (7 g/L), Citric acid (0.5 g/l), trace mineral solution (5 mL/L). The trace mineral stock solution contained; ZnSO$_4$*7H$_2$O 0.82 g/L, Citric acid 20 g/L, MnSO$_4$*H$_2$O 0.98 g/L, FeSO$_4$*7H$_2$O 3.925 g/L, CuSO$_4$*5H$_2$O 0.2 g/L. The pH of the Basal Minimal Medium was adjusted to 7.0 with 5 N NaOH and autoclaved. The precultures were incubated for 24 hours at 34° C. and 1000 rpm shaking and then further transferred to 0.75 mL of a new BMM (pH 7,5) to start the main culture. The new BMM was supplemented with magnesium sulphate (0.12 g/L), thiamine (0.02 g/L), a bolus of glucose solution (0.1-0.15 g/L) and a bolus of lactose solution (5-20 g/L) Moreover, a 20% stock solution of sucrose (40-45 g/L) or maltodextrin (19-20 g/L) was provided as carbon source, accompanied by the addition of a specific hydrolytic enzyme, sucrose hydrolase or glycoamylase, respectively, so that glucose was released at a rate suitable for carbon-limited growth and similar to that of a typical fed-batch fermentation process. The main cultures were incubated for 72 hours at 28° C. and 1000 rpm shaking. For the analysis of total broth, the 96 well plates were boiled at 100° C., subsequently centrifuged, and finally the supernatants were analysed by HPLC.

Fermentation

Two LNT-producing *E. coli* strains, MP0 (control) and MP1 (opgB/opgE double knock-out), were cultivated in

TABLE 5

Genotypes of the strains used in fermentation

| Strain ref | Genotype |
|---|---|
| MDO | F- λ- ΔendA1 ΔrecA1 ΔrelA1 ΔgyrA96 Δthi-1 glnV44 hsdR17(rK–mK–) ΔlacZ wcaF::Plac ΔnanKETA ΔlacA ΔmelA ΔwcaJ ΔmdoH |
| MP0 | MDO, 3x PglpF-IgtA[1], 2x PglpF-galTK[2], PglpF-SD1-Pscr-scrYA[3], Pscr-scrBR[4], PglpF-LacY[5], PglpF-Nec[6], |
| MP1 | MDO, 3x PglpF-IgtA[1], 2x PglpF-galTK[2], PglpF-SD1-Pscr-scrYA[3], Pscr-scrBR[4], PglpF-LacY[5], PglpF-Nec[6], ΔopgE[7], ΔopgB[8] |
| MP2 | MDO, 2x PglpF-IgtA[1], PglpF-galT[9], PglpF-SD1-Pscr-scrYA[3], Pscr-scrBR[4], PglpF-LacY[5], 2xPglpF- Exporters[10] |
| MP3 | MDO, 2x PglpF-IgtA[1], PglpF-galT[9], PglpF-SD1-Pscr-scrYA[3], Pscr-scrBR[4], PglpF-LacY[5], 2xPglpF-Exporters[10], ΔopgE[7], ΔopgB[8] |

[1]IgtA-PglpF - three genomically inserted copies of a gene encoding β-1,3-N-acetyl-glucosaminyltransferase (SEQ ID NO: 6) under control of a PglpF promoter (SEQ ID NO: 22).
[2]galTK-PglpF - one genomically inserted gene encoding β-1,3-Galactosyltransferase (SEQ ID NO: 7) under control of a PglpF promoter (SEQ ID NO: 22).
[3]PglpF-SD1-Pscr-scrYA - one genomically inserted copy of the scrY and scrA gene cluster (WO2015/197082) under control of a dual PglpF-SD1 (SEQ ID NO: 33) Pscr promoter (SEQ ID NO: 34).
[4]Pscr-scrBR - one genomically inserted copy of the scrB and scrR gene cluster (WO2015/197082) under control of a Pscr (SEQ ID NO: 34) promoter.
[5]PglpF-LacY - one genomically inserted gene encoding the lactose permease LacY (SEQ ID NO: 9) under control of a PglpF promoter (SEQ ID NO: 22).
[6]PglpF-Nec - one genomically inserted gene encoding the MFS transporter Nec (SEQ ID NO: 5) under control of a PglpF promoter (SEQ ID NO: 22).
[7]ΔopgE deletion of phosphoethanolamine transferase OpgE encoding gene (SEQ ID NO: 2).
[8]ΔopgB deletion of phosphoglycerol transferase I and II encoding gene (SEQ ID NO: 1)
[9]PglpF-galT - one genomically inserted gene encoding β-1,4-Galactosyltransferase (SEQ ID NO: 8) under control of a PglpF promoter.
[10]2xPglpF-Exporters - two differently genomically inserted genes encoding transporters capable of exporting LNnT out of the cell. Such transporters are for example described in WO2021/148611, WO2021/148610 and PCT/EP2024/054663.

Deep Well Assay

Deep Well Assays in the current examples were performed as originally described to Lv et al (Bioprocess Biosyst Eng 20 (2016) 39:1737-1747) and optimized for the purposes of the current disclosure. More specifically, the strains disclosed in the present example were screened in 96 deep well plates using a 4-day protocol. During the first 24 hours, precultures were grown to high densities (OD600 up to 5) and subsequently transferred to a medium that allowed induction of gene expression and product formation.

More specifically, during day 1, fresh precultures were prepared using a basal minimal medium (BMM) (pH 7,0)

duplicate runs in 250 mL single-use fermenters (AMBR250 automated mini-bioreactor system, Sartorius, Germany), starting with 100 mL of mineral medium consisting of 31.2 g/kg sucrose as carbon source, MgSO$_4$×7H$_2$O, KOH, H$_3$PO$_4$, citric acid, trace element solution (containing Fe, Mn, Zn, Cu, Mo and Se), antifoam and thiamine. The dissolved oxygen level was kept at 23% by a cascade of first agitation and then airflow starting at 700 rpm and 1 VVM, respectively. The pH was kept at 6.8 by titration with 8.5% NH$_4$OH solution, which at the same time served as a nitrogen source. The cultivations were started with 2% (v/v) inoculums from pre-cultures grown in a similar sucrose containing medium. After depletion of the sucrose contained in the batch medium, a feed solution containing 49% (w/w) sucrose, $MgSO_4 \times 7H_2O$, KOH, $H_3PO_4$, citric acid, trace element solution (elements as above), antifoam and thiamine, was fed continuously using a predetermined feeding profile to ensure carbon-limited growth conditions, starting at an initial feed rate of 3.14 g sucrose/kg broth/h. Furthermore, daily bolus additions of a $(NH_4)_2SO_4$ stock solution (400 g/kg) were used to maintain a sufficient level of ammonium in the fermentation broth. The temperature was initially controlled at 33° C. and dropped to 27° C. with a 5 h ramp after 20 hours of feeding. The acceptor lactose was added as a bolus addition at feed start of a 25% (w/w) lactose monohydrate solution and then every 24 hours to keep lactose from being limiting. The growth and metabolic activity and state of the cells were followed by on-line measurement of reflectance and $CO_2$ evolution rate, as well as off-line measurement of biowetmass concentration (BWM). Daily fermentation samples were analysed by HPLC for product (LNT), acceptor (lactose), and major by-products such as trisaccharide LNT II, hexasaccharide pLNH2, phosphoethanolamine-LNT (EP-LNT) and phosphoglycerol-LNT (GP-LNT). The fermentation was stopped after approximately 115 h.

Example 1—Production of LNT by fermentation

Genetically engineered cells capable of producing LNT carrying the ΔopgE and ΔopgB deletions were subjected to fermentation and their ability to reduce the production of by-products, while maintaining an acceptable LNT production level was assessed.

To evaluate the effect of the deletion of the opgE and opgB genes described herein the strains were tested in a fermentation process, wherein the strains were fermented as described in the "Method" section above.

Once the fermentation of the strains was completed the content was analysed by HPLC for desired product (LNT), acceptor (lactose), and major by-products such as trisaccharide LNT II, hexasaccharide pLNH2, phosphoethanolamine-LNT (EP-LNT) and phosphoglycerol-LNT (GP-LNT) as is shown in FIG. 4.

In FIG. 4, the chromatogram of MP0 (top chromatogram) shows that GP-LNT and EP-LNT elutes from the HPLC column at about 6.7 minutes and about 9.15 minutes, respectively. For MP1 the absence of the peaks at about 6.7 minutes (GP-LNT) and about 9.15 minutes (EP-LNT), clearly shows that the strain carrying the opgE and opgB deletion does not produce a GP-LNT or EP-LNT.

Figure 5:
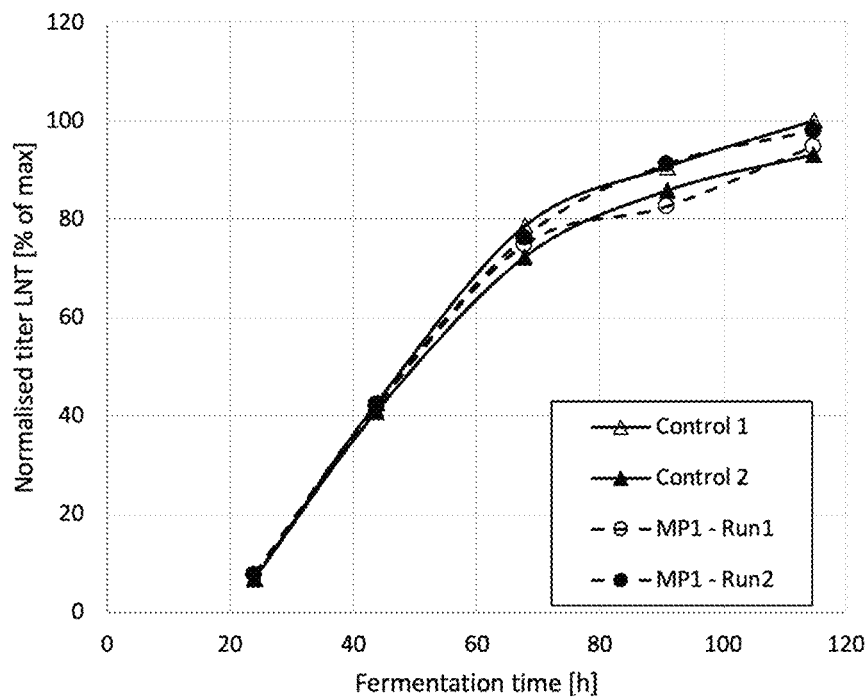
FIG. 5 Relative yield of LNT following fermentation of MP0 and MP1. Yield is relative to maximum LNT yield obtained from MP0 fermentation.

The total LNT content from the fermentation of the LNT producing strains MP0 and MP1 was analysed, and the results are shown in Table 6 and in FIG. 5 (LNT titer normalized to maximal MP0 LNT production in %), FIG. 6 (EP-LNT/LNT ratio as mass %) and FIG. 7 (GP-LNT/LNT ratio as mass %).

TABLE 6

Average LNT production by the ΔopgE, ΔopgB strain (MP1) relative to average LNT production by strain set to 100% (MP0) (fermentations were run in duplicates).

| Strain | Average Relative LNT amount produced at end of fermentation (% mass)* | phosphoglycerol-LNT/LNT ratio (mass %) | phosphoethanolamine-LNT/LNT ratio (mass %) |
|---|---|---|---|
| MP0 | 100 | 0.21% | 2.6% |
| MP1 | 99.8 | 0 | 0 |

As can be seen in table 6 along with FIG. 5, the overall production of LNT in the MP1 strain is comparable (99.8%) to the amount of LNT produced by the strain MP0, showing that deletion of the ΔopgE and ΔopgB genes does not have a major impact on the production yields of LNT.

I can also be seen from table 4 and FIG. 6, that MP0 produced about 0.21% (mass %) of EP-LNT relative to the amount of LNT produced during the fermentation. Accordingly, the mass ratio of LNT:EP-LNT was about 475:1 for the MP0 strain. In addition, it can also be seen in table 4 and FIG. 7 that MP0 produced about 2.6% (mass %) of GP-LNT relative to the amount of LNT produced during the fermentation. Accordingly, the mass ratio of LNT:EP-LNT was about 38:1 for the MP0 strain.

In comparison, as can be seen from table 4 and FIGS. 6 and 7, MP1 did not produce detectable amounts of either of the by-products GP-LNT and EP-LNT.

Accordingly, deletion of the ΔopgE and ΔopgB genes abolishes the formation of phosphoglycerol-LNT and phosphoethanolamine-LNT, without having a major effect on the overall production of LNT.

Deletion of the opgE and opgB genes offers the benefit of reducing the level of by-products carrying phosphoethanolamine (EP) and phosphoglycerol (GP) moieties, since these two genes expresses the transferases responsible for transferring EP and GP moieties to oligosaccharides (see FIG. 1). Accordingly, deletion of these genes allows for production of LNT without production of the unwanted by-products phosphoglycerol-LNT (GP-LNT) and phosphoethanolamine-LNT (EP-LNT) (see FIG. 2). Importantly, the deletion of the OpgE and OpgB genes should not negatively influence the production of the main product to a major extend, since this would decrease the commercial value of the strains, since a major decreased yield production would have a major impact on production cost.

Example 2—Production of LNnT by Fermentation

The ability to produce LNnT in genetically engineered cells with or without opgE and opgB genes was assessed in a deep well assay as described in the "Method" section above, to evaluate the effect of the deletion of the opgE and opgB genes on the LNnT production.

Figure 8:
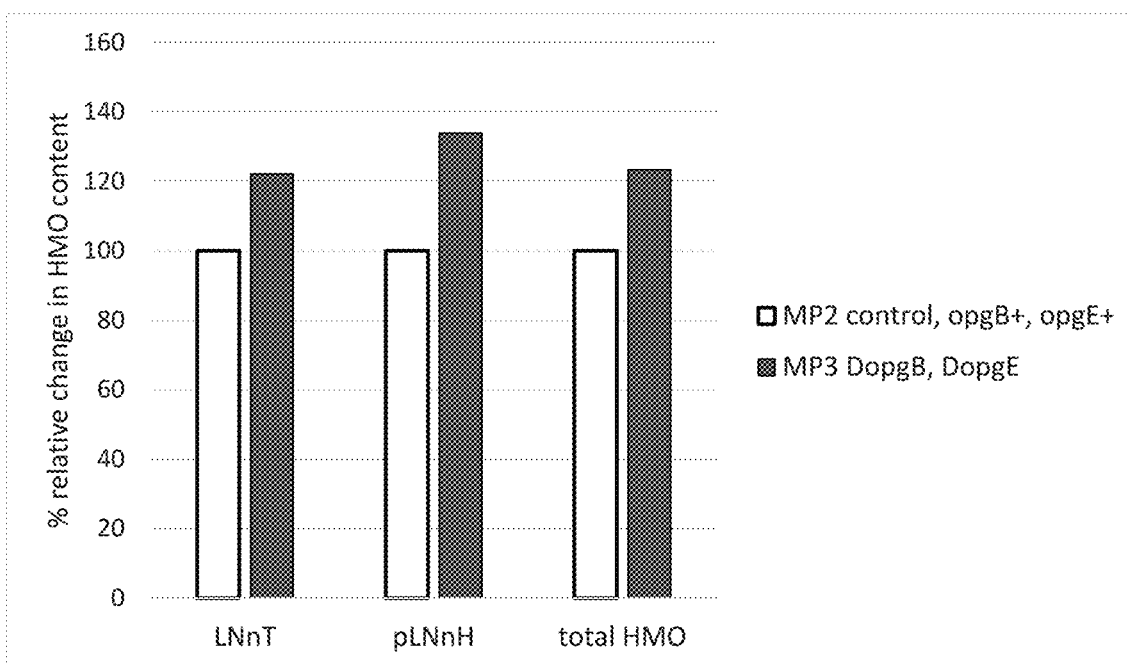
FIG. 8 Relative LNnT, pLNnH and total HMO production of ΔopgE (DopgE) and ΔopgB (DopgB) (MP3) to the control strain (MP2).

The formation of the HMOs LNnT and pLNnH was detected using HPLC. In the deep well assay no phosphoglycerol- and phosphoethanolamine-substituted by-products were observed in the HPLC for the control strain (MP2), or the ΔopgE and ΔopgB strain (MP3). Table 7 and FIG. 8 shows comparative data where the total amount of the individual HMO or total HMO is set to 100% in the control strain.

TABLE 7

Average LNnT, pLNnH and total HMO production by the ΔopgE, ΔopgB strain (MP3) relative to the respective average LNnT, pLNnH and total HMO production by the control strain (MP2).

| Strain | Description | LNnT | pLNnH | total HMO |
|---|---|---|---|---|
| MP2 | control, opgB+, opgE+ | 100 | 100 | 100 |
| MP3 | ΔopgE and ΔopgB | 122 | 134 | 123 |

From table 7, which is also presented in FIG. 8, it can be seen that the deletion of opgE and opgB in a LNnT production strain can increase the Total HMO formation with more than 20% compared to the control strain. The formation of LNnT and pLNnH was also increased by more than 20% relative to the formation of the same products in the control strains.

LNnT constituted 88% and pLNnH constituted 12% of the total HMO produced by the ΔopgE, ΔopgB strain (MP3), which was similar to the control strain (MP2) which produced 89% LNnT and 11% pLNnH.

The absence of the phosphoglycerol- and phosphoethanolamine-substituted by-products in the control strain may be due to an efficient export system of LNnT out of the cell.

The invention claimed is:

1. A genetically engineered gram-negative bacterial cell comprising:
a recombinant nucleic acid sequence that encodes a glycosyltransferase, wherein the glycosyltransferase is selected from the group consisting of: β-1,3-N-acetyl-glucosaminyltransferase, β-1,3-galactosyltransferase and β-1,4-galactosyltransferase; and
a deleted or dysfunctional endogenous opgB gene or a deleted or dysfunctional endogenous opgE gene,
wherein the endogenous deleted or dysfunctional opgB gene natively encodes a protein having an amino acid sequence comprising the amino acids of positions 165 to 763 of SEQ ID NO: 3 or a protein having an amino acid sequence with at least 95% sequence identity to the amino acids of positions 165 to 763 of SEQ ID NO: 3;
wherein the endogenous deleted or dysfunctional opgE gene natively encodes a protein having an amino acid sequence comprising the amino acid sequence set forth in SEQ ID NO: 4, or a protein having an amino acid sequence with at least 95% sequence identity to SEQ ID NO: 4;
wherein the deleted or dysfunctional endogenous opgB gene results in a decreased or total loss of function of phosphoglycerol transferase I and II, and the deleted or dysfunctional endogenous opgE gene results in a decreased or total loss of function of phosphoethanolamine transferase; and
wherein the gram-negative bacterial cell produces one or more heterologous oligosaccharides under fermentative conditions and is selected from the group consisting of: *Escherichia* sp., *Klebsiella* sp., *Salmonella* sp. and *Shigella* sp.

2. The genetically engineered gram-negative bacterial cell of claim 1, wherein the cell further comprises a deleted or dysfunctional endogenous opgC gene that (a) encodes a protein having the amino acid sequence set forth in SEQ ID NO: 36, or a protein having an amino acid sequence with at least 95% sequence identity to SEQ ID NO: 36, and (b) results in a decreased or total loss of function of osmoregulated periplasmic glucan (OPG) biosynthesis protein C.

3. The genetically engineered gram-negative bacterial cell of claim 1, wherein the deleted or dysfunctional endogenous opgB gene encodes a protein having the amino acid sequence set forth in SEQ ID NO: 3, or a protein having an amino acid sequence with at least 95% sequence identity to SEQ ID NO: 3.

4. The genetically engineered gram-negative bacterial cell of claim 1, wherein the cell comprises a deleted or dysfunctional endogenous opgB gene and a deleted or dysfunctional endogenous opgE gene.

5. The genetically engineered gram-negative bacterial cell of claim 1, wherein the one or more heterologous oligosaccharides contain a lacto-N-triose II (LNT-II) core structure.

6. The genetically engineered gram-negative bacterial cell of claim 1, wherein the cell produces one or more human milk oligosaccharides (HMOs) with a lacto-N-triose II (LNT-II) core structure under fermentative conditions.

7. The genetically engineered gram-negative bacterial cell of claim 6, wherein the cell produces a human milk oligosaccharide (HMO) under fermentative conditions, and wherein the HMO is selected from the group consisting of lacto-N-tetraose (LNT), lacto-N-neotetraose (LNnT), LNT-II, lacto-N-fucopentaose I (LNFP-I), lacto-N-fucopentaose II (LNFP-II), lacto-N-fucopentaose III (LNFP-III), lacto-N-fucopentaose V (LNFP-V), lacto-N-fucopentaose V (LNFP-VI), lacto-N-difucohexaose I (LNDFH-I), lacto-N-difucohexaose II (LNDFH-II), lacto-N-difucohexaose III (LNDFH-III), para-lacto-N-hexaose (pLNH), fucosyl-para-lacto-N-hexaose I (F-pLNH I), para-lacto-N-neohexaose (pLNnH), 3'-O-sialyllacto-N-tetraose a (LST a), 6'-O-sialyllacto-N-tetraose b (LST b), 6'-O-sialyllacto-N-neotetraose (LST c) and disialyl-lacto-N-tetraose (DSLNT).

8. The genetically engineered gram-negative bacterial cell of claim 1, wherein the glycosyltransferase is heterologous.

9. The genetically engineered gram-negative bacterial cell of claim 1, wherein the engineered gram-negative bacterial cell is *Escherichia coli*.

10. A method for producing one or more heterologous oligosaccharides comprising:
   a. providing the genetically engineered gram-negative bacterial cell of claim 1,
   b. cultivating the genetically engineered gram-negative bacterial cell in a culture medium; and
   c. recovering the one or more heterologous oligosaccharides product.

11. The method of claim 10, wherein the production of the one or more heterologous oligosaccharides is not reduced by more than 15% when compared to a cell which does not have a decreased or total loss of function of a phosphoglycerol transferase I and II and/or a phosphoethanolamine transferase and/or osmoregulated periplasmic glucan (OPG) biosynthesis protein C.

12. The method of claim 10, wherein a reduced amount of by-product oligosaccharides comprising a phosphoethanolamine-moiety, glycerophosphate-moiety, and/or succinyl-moiety are produced compared to a method with a cell containing the phosphoglycerol transferase I and II and/or a phosphoethanolamine transferase and/or osmoregulated periplasmic glucan (OPG) biosynthesis protein C.

13. The method of claim 12, wherein the by-product oligosaccharide comprising a glycerophosphate-moiety is phosphoglycerol-LNT or phosphoglycerol-LNnT, and/or the by-product oligosaccharide comprising a phosphoethanolamine-moiety is phosphoethanolamine-LNT or phosphoethanolamine-LNnT.

14. The method of claim 10, wherein the oligosaccharide is one or more human milk oligosaccharides (HMOs) selected from the group consisting of LNT, LNnT, LNT-II, LNFP-I, LNFP-II, LNFP-III, LNFP-V, LNFP-VI, LNDFH-I, LNDFH-II, LNDFH-III, pLNH, F-pLNH I, pLNnH, LST a, LST b, LST c and DSLNT.

15. The method of claim 14, wherein the one or more HMOs comprises LNT or LNnT.

16. The method of claim 13, wherein the ratio of LNT:phosphoglycerol-LNT (w/w) produced in the culturing step b) is at least 500:1.

17. The method of claim 13, wherein the ratio of LNT:phosphoethanolamine-LNT (w/w) produced in the culturing step b) is at least 50:1.

18. The method of claim 11, wherein the production of the oligosaccharide is not reduced by more than 10%.

19. The method of claim 13, wherein the ratio of LNT:phosphoglycerol-LNT (w/w) produced in the culturing step b) is at least 1000:1.

20. The method of claim 13, wherein the ratio of LNT:phosphoethanolamine-LNT (w/w) produced in the culturing step b) is at least 300:1.

* * * * *

SEQUENCE LISTING

```
Sequence total quantity: 36
SEQ ID NO: 1            moltype = DNA  length = 2292
FEATURE                 Location/Qualifiers
source                  1..2292
                        mol_type = genomic DNA
                        organism = Escherichia coli
SEQUENCE: 1
ttgtcagaac tactctcttt cgcccttttt ctcgcctctg tgctgattta cgcatggaaa    60
gcgggacgta acacctggtg gtttgcagcc acgttaacgg tgctggggct atttgtcgtt   120
ttaaaatatca ccctgtttgc cagcgactat tttactggcg atggtattaa cgacgcggtt  180
ctctataccct taaccaacag cctgaccggt gctggcgtca gcaaatacat tttgccgggt  240
atcggcattg tgctggggct gacagcggtg ttcggtgcgc tgggctggat cctgcgccgt  300
cgtcgccatc atccgcacca ttttggttac agcctgctgg cgctcttact ggcgctgggt  360
tcggtggacg ccagcccggc atttcgtcag ataacggaac tggtgaaatc ccagtcacgc  420
gacggcgacc cggactttgc ggcttattat aaagagccgt cgaaaactat ccctgacccg  480
aaactcaacc tggtttatat ctacggcgaa agtctcgagc ggacctattt tgataacgag  540
gctttcccgg atctcacgcc tgaactgggc gcgttgaaaa atgaaggcct ggatttcagc  600
cacacgcagc agctgccggg aacagattac acgattgcgg gcatggtggc ttctcagtgc  660
ggcataccgc tgtttgcccc ctttgaaggc aacgcctccg cctctgtctc cagcttcttc  720
ccgcagaaca tctgtctggg agatatcctg aaaaactcgg gttatcagaa ctatttcgtt  780
cagggcgcga atctgcgttt tgccggtaaa gatgtgttcc tgaagtcgca tggcttcgac  840
cacttatacg gctcagaaga gctgaaaagc gtggtagccg acccgcacta tcgcaacgac  900
tggggattct acgacgatac cgttctcgat gaagcgtgga aaagtttga agagctttcc  960
cgctcaggtc agcgattctc actgtttacc ctgacagtcg ataccatca cccggatggt 1020
tttatctctc gtacctgtaa ccgcaaaaaa tatgattttg acggtaaacc gaatcagtca 1080
ttcagcgcgg taagttgcag ccaggagaac atcgcgacgt ttatcaacaa aatcaaagcg 1140
tcaccgtggt ttaaagatac cgtcatcgtc gtctcttctg accatttagc gatgaacaac 1200
acggcgtgga aatacctcaa taagcaggat cgcaataacc tgttttttgt cattcgtggc 1260
gacaagccgc agcaagagac gctggcagtg aagcgtaaca cgatggataa cggcgcgacg 1320
gtgctggaca ttctcggtgg cgataactat ctcggacttg tcgtagcag tttatccggg 1380
cagtcgatgt cggaaatctt cctcaatatc aaagagaaaa cattggcgtg gaagccagat 1440
atcatccgcc tgtggaaatt ccctaaagag atgaaagagt tcaccatcga ccagcagaaa 1500
aacatgattg ccttctcggg tagccatttc cgtttgcgtg tgctgttgcg ggtttcagac 1560
aaacgcgtgg aaccgctgcc ggaaagcgaa tactcagcac cgctgcgttt ccagctggcc 1620
gatttcgctc cacgcgacaa tttcgtctgg gttgaccgtt gctacaagat ggcacaactc 1680
tgggctccgg aactggcact ttccaccgac tggtgtgtct cgcaagggca gcttggcggt 1740
cagcaaattg ttcagcatgt tgacaaaaca acatggcagg gcaaaacggc atttaaagat 1800
acggtcatcg acatgcgcgc ttacaaaggc aatgtcgata cgctgaagat tgttgataac 1860
gatattcgct acaaagccga cagtttcatc tttaacgtcg ccggtgcgcc agaagaggtg 1920
aaacagttta gcgggatttc ccgtccggag tcgtggggcc gctggtccaa cgcgcagctg 1980
ggcgatgaag taaaaatcga gtacaagcat ccgctgccga agaaatttga cctggtgatt 2040
accgccaaag catacggcaa taacgccagc cgtcctattc cggtacgcgt aggcaatgaa 2100
gaacaaactc ttgtgctggg caatgaagtg accaccacca cactgcattt cgataaccca 2160
accgatgccg acacactggt aatttgtgcg ccggaacctg tctcaaccaa cgaagggaat 2220
atcctcggac actcgccgcg taagctcggg atcggcatgg tggaaattaa agtggtagaa 2280
cgtgaagggt aa                                                      2292

SEQ ID NO: 2            moltype = DNA  length = 1584
FEATURE                 Location/Qualifiers
source                  1..1584
                        mol_type = genomic DNA
                        organism = Escherichia coli
SEQUENCE: 2
atgaatttaa ccctcaaaga atcgcttgtt acccgtagcc gggtatttag cccgtggact    60
gcgttctact ttttacagtc gctattaatt aacctcggct taggttaccc cttcagtttg   120
ctctacaccg ctgcgtttac ggctattttg cttttgctat ggcgaacatt gcctcgcgta   180
caaaaagttc tggtcggtgt cagttcgctg gtggcggctt gttatttccc ttttgctcag   240
gcctacggcg cgcctaattt caatacattg ctggcattgc actccaccaa tatggaagag   300
tcgaccgaaa tcctgacgat ttttccgtgg tacagctacc tggtcggctt atttattttt   360
gcgctcggcg taatagcaat caggcgaaaa aagagaatg aaaagcgcg ctggaatacc   420
ttcgacagcc tgtgtctggt attcagtgtg gcgacatttt ttgttgctcc cgtgcaaaac   480
ctggcctggg gtggcgtatt taaactgaaa gatactgcgt atccggtatt tcgtttttgct   540
aaggatgtca tcgtcaataa taacgaggtg attgaagagc aagaacggat ggcaaaactt   600
tccggaatga aagatacctg gacggtcact gccgttaagc cgaagtatca gacctatgtg   660
gtggtgatcg gtgaaagcgc gcgtcgcgat gccctcggtg ccttggcgg tcactgggac   720
aataccccgt ttgccagcag cgttaacggt ttgatatttg ctgactacat tcgccgcagt   780
ggctccacgc agaaatcgct tggcttaacg ctcaatcgcg ttgtcgatgg caaaccacag   840
tttcaggata acttttgtcac cctggcaaat cgcgcgggct tccagacctg gtgttttttcc   900
aaccagggtc aaatcggcga atacgatacc gctatcgcca gcatcgccaa acgagcagat   960
gaagtgtact tcctgaaaga aggtaattt gaagcagata aaaacaccaa agacgaagcg  1020
ttactggata tgaccgctca agtgctggcg caagagcact cgcaaccgca gctgattgtt  1080
```

```
ctacatctga tgggctcaca tccgcaggcc tgcgacagga cacaaggaaa atacgaaacc   1140
tttgtgcaat cgaaagaaac gtcgtgctat ctctatacca tgacgcaaac ggacgattta   1200
ctgcgcaagc tgtacgatca gttacgcaac agcggcagca gcttctcgct ggtttacttt   1260
tctgaccacg gtctggcctt taagagcgcg gtaaagacg tgcaatacct tgcccatgat    1320
gataaatatc agcaaaattt ccaggtgcct tttatggtca tttccagcag cgataaagcg   1380
catcgtgtga ttaaagcccg ccgctcagcc aatgacttct taggctttt ctcccagtgg    1440
acggggatta aagcgaagga aattaacatc aaatacccgt ttatatctga aagaaagcc    1500
gggccgatat acatccaccaa cttccagtta cagaaggtgg attacaacca tctcggaacc   1560
gatattttcg acccgaaacc ttaa                                           1584

SEQ ID NO: 3                moltype = AA  length = 763
FEATURE                     Location/Qualifiers
source                      1..763
                            mol_type = protein
                            organism = Escherichia coli
SEQUENCE: 3
MSELLSFALF LASVLIYAWK AGRNTWWFAA TLTVLGLFVV LNITLFASDY FTGDGINDAV     60
LYTLTNSLTG AGVSKYILPG IGIVLGLTAV FGALGWILRR RRHHPHHFGY SLLALLLALG    120
SVDASPAFRQ ITELVKSQSR DGDPDFAAYY KEPSKTIPDP KLNLVYIYGE SLERTYFDNE    180
AFPDLTPELG ALKNEGLDFS HTQQLPGTDY TIAGMVASQC GIPLFAPFEG NASASVSSFF    240
PQNICLGDIL KNSGYQNYFV QGANLRFAGK DVFLKSHGFD HLYGSEELKS VVADPHYRND    300
WGFYDDTVLD EAWKKFEELS RSGQRFSLFT LTVDTHHPDG FISRTCNRKK YDFDGKPNQS    360
FSAVSCSQEN IATFINKIKA SPWFKDTVIV VSSDHLAMNN TAWKYLNKQD RNNLFFVIRG    420
DKPQQETLAV KRNTMDNGAT VLDILGGDNY LGLGRSSLSG QSMSEIFLNI KEKTLAWKPD    480
IIRLWKFPKE MKEFTIDQQK NMIAFSGSHF RLPLLLRVSD KRVEPLPESE YSAPLRFQLA    540
DPAPRDNFVW VDRCYKMAQL WAPELALSTD WCVSQGQLQG QQIVQHVDKT TWQGKTAFKD    600
TVIDMARYKG NVDTLKIVDN DIRYKADSFI FNVAGAPEEV KQFSGISRPE SWGRWSNAQL    660
GDEVKIEYKH PLPKKFDLVI TAKAYGNNAS RPIPVRVGNE EQTLVLGNEV TTTTLHFDNP    720
TDADTLVIVP PEPVSTNEGN ILGHSPRKLG IGMVEIKVVE REG                      763

SEQ ID NO: 4                moltype = AA  length = 527
FEATURE                     Location/Qualifiers
source                      1..527
                            mol_type = protein
                            organism = Escherichia coli
SEQUENCE: 4
MNLTLKESLV TRSRVFSPWT AFYFLQSLLI NLGLGYPFSL LYTAAFTAIL LLLWRTLPRV     60
QKVLVGVSSL VAACYPPFAQ AYGAPNFNTL LALHSTNMEE STEILTIPPW YSYLVGLFIF    120
ALGVIAIRRK KENEKARWNT FDSLCLVFSV ATFFVAPVQN LAWGGVFKLK DTGYPVFRFA    180
KDVIVNNNEV IEEQERMAKL SGMKDTWTVT AVKPKYQTYV VVIGESARRD ALGAFGGHWD    240
NTPFASSVNG LIFADYIAAS GSTQKSLGLT LNRVVDGKPQ FQDNFVTLAN RAGFQTWWFS    300
NQGQIGEYDT AIASIAKRAD EVYFLKEGNF EADKNTKDEA LLDMTAQVLA QEHSQPQLIV    360
LHLMGSHPQA CDRTQGKYET FVQSKETSCY LYTMTQTDDL LRKLYDQLRN SGSSFSLVYF    420
SDHGLAFKER GKDVQYLAHD DKYQQNFQVP FMVISSDDKA HRVIKARRSA NDFLGFFSQW    480
TGIKAKEINI KYPFISEKKA GPIYITNFQL QKVDYNHLGT DIFDPKP                  527

SEQ ID NO: 5                moltype = AA  length = 394
FEATURE                     Location/Qualifiers
source                      1..394
                            mol_type = protein
                            organism = Rosenbergiella nectarea
SEQUENCE: 5
MQSFTPPAPK GGNPVFMMFM LVTFFVSIAG ALQAPTLSLY LSQELAAKPF MVGLFFTINA     60
VTGIIISFIL AKRSDRKGDR RRLLMFCCAM AIANALMPAF VRQYVVLITL GLILSALTSV    120
VMPQLFALAR EYADRTGREV VMFSSVMRTQ MSLAWVIGPY ISFALALNYG FITLYLVAAA    180
LFLLSLILIK TTLPSVPRLY PAEDLAKSAA SGWKRTDVRF LFAASVLMWV CNLMYIIDMP    240
LYISKSLGMP ESFAGVLMGT AAGLEIPVML LAGYLAKRVG KRPLVIVAAV CGLAFYPAML    300
VFHQQTGLLI IQLLNAVFIG IVAGLVMLWF QDLMPGKAGA ATTLFTNSVS TGMIFAGLCQ    360
GLLSDLLGHQ AIYVLATVLM VIALLLLLRV KEQA                                394

SEQ ID NO: 6                moltype = AA  length = 332
FEATURE                     Location/Qualifiers
source                      1..332
                            mol_type = protein
                            organism = Neisseria meningitidis
SEQUENCE: 6
MQPLVSVLIC AYNVEKYFAQ SLAAVVNQTW RNLEILIVDD GSTDGTLAIA KDFQKRDSRI     60
KILAQAQNSG LIPSLNIGLD ELAKSGMGEY IARTDADDIA APDWIEKIVG EMEKDRSIIA    120
MGAWLEVLSE EKDGNRLARH HRHGKIWKKP TRPEDIADFF PFGNPIHNNT MIMRRSVIDG    180
GLRYNTERDW AEDYQFWYDV SKLGRLAYYP EALVKYRLHA NQVSSKYSIR QHEIAQGIQK    240
TARNDFLQSM GFKTRFDSLE YRQIKAVAYE LLEKHLPEED FERARRFLYQ CFKRTDTLPA    300
GAWLDFAADG RMRRLFTLRQ YFGILHRLLK NR                                  332

SEQ ID NO: 7                moltype = AA  length = 439
FEATURE                     Location/Qualifiers
source                      1..439
                            mol_type = protein
                            organism = Helicobacter pylori
SEQUENCE: 7
```

```
MISVYIISLK ESQRRLDTEK LVLESNEKFK GRCVFQIFDA ISPKHEDFEK FVQELYDSSS    60
LLKSDWFHSD YCYQELLPQE FGCYLSHYLL WKECVKLNQP VVILEDDVAL ESNFMQALED   120
CLKSPFDFVR LYGHYWGGHK TNLCALPVYT ETEEAEASIE KTPIENYEVT SPPPPNPTRD   180
TQQDFITETQ QDPKELSEPC KIAPQKISFN QVVFKKIKRK LNRFIGSILA RTEVYKNIVA   240
KYDDLTTKYD DLTTKYDDLT TKYDDLTTKY DDLNKNIAEK YDELMGKYES LLAKEVNIKE   300
TFWESRADSE KEALFLDHFY LTSVYVATTA GYYLTPKGAK TFIEATERFK IIEPVDMFIN   360
NPTYHDIANF TYVPCPVSLN KHAFNSTIQN AKKPDISLKP PKKSYFDNLF YHKFNARKCL   420
KAFNKYSKQY APLKTPKEV                                               439

SEQ ID NO: 8              moltype = AA   length = 273
FEATURE                   Location/Qualifiers
source                    1..273
                          mol_type = protein
                          organism = Helicobacter pylori
SEQUENCE: 8
MRVFAISLNQ KVCDTFGLVF RDTTTLLNSI NATHHQAQIF DAIYSKTFEG GLHPLVKKHL    60
HPYFITQNIK DMGITTNLIS EVSKFYYALK YHAKFMSLGE LGCYASHYSL WEKCIELNEA   120
ICILEDDITL KEDFKEGLDF LEKHIQELGY IRLMHLLYDA SVKSEPLSHK NHEIQERVGI   180
IKAYSEGVGT QGYVITPKIA KVFLKCSRKW VVPVDTIMDA TFIHGVKNLV LQPFVIADDE   240
QISTIARKEE PYSPKIALMR ELHFKYLKYW QFV                                273

SEQ ID NO: 9              moltype = AA   length = 417
FEATURE                   Location/Qualifiers
source                    1..417
                          mol_type = protein
                          organism = Escherichia coli
SEQUENCE: 9
MYYLKNTNFW MFGLFFFFYF FIMGAYFPFF PIWLHDINHI SKSDTGIIFA AISLFSLLFQ    60
PLFGLLSDKL GLRKYLLWII TGMLVMFAPF FIFIFGPLLQ YNILVGSIVG GIYLGFCFNA   120
GAPAVEAFIE KVSRRSNFEF GRARMFGCVG WALCASIVGI MFTINNQPVF WLGSGCALIL   180
AVLLFFAKTD APSSATVANA VGANHSAFSL KLALELFRQP KLWFLSLYVI GVSCTYDVFD   240
QQFANFFTSF FATGEQGTRV FGYVTTMGEL LNASIMFFAP LIIINRIGGKN ALLLAGTIMS   300
VRIIGSSFAT SALEVVILKT LHMFEVPFLL VGCFKYITSQ FEVRFSATIY LVCFCFFKQL   360
AMIFMSVLAG NMYESIGFQG AYLVLGLVAL GFTLISVFTL SGPGPLSSLLR RQVNEVA     417

SEQ ID NO: 10             moltype = DNA   length = 203
FEATURE                   Location/Qualifiers
source                    1..203
                          mol_type = other DNA
                          organism = Synthetic construct
SEQUENCE: 10
tgcgtcgcca ttctgtcgca acacgccaga atgcggcggc gatcactaac tcaacaaatc    60
aggcgatgta accgctttca atctgtgagt gatttcacag tatcttaaca atgtgatagc   120
tatgattgca ccgtgcctac aagcatcgtg gaggtccgtg actttcacgc atacaacaaa   180
cattaaccaa gagaaaaaca gct                                          203

SEQ ID NO: 11             moltype = DNA   length = 203
FEATURE                   Location/Qualifiers
source                    1..203
                          mol_type = other DNA
                          organism = Synthetic construct
SEQUENCE: 11
tgcgtcgcca ttctgtcgca acacgccaga atgcggcggc gatcactaac tcaacaaatc    60
aggcgatgta accgctttca atctgtgagt gatttcacag tatcttaaca atgtgatagc   120
tatgattgca ccgtgcctac aagcatcgtg gaggtccgtg actttcacgc atacaacaaa   180
cattaaccaa ctgagaaaca gct                                          203

SEQ ID NO: 12             moltype = DNA   length = 203
FEATURE                   Location/Qualifiers
source                    1..203
                          mol_type = other DNA
                          organism = Synthetic construct
SEQUENCE: 12
tgcgtcgcca ttctgtcgca acacgccaga atgcggcggc gatcactaac tcaacaaatc    60
aggcgatgta accgctttca atctgtgagt gatttcacag tatcttaaca atgtgatagc   120
tatgattgca ccgtgcctac aagcatcgtg gaggtccgtg actttcacgc atacaacaaa   180
cattaacaaa aaccggagat acc                                          203

SEQ ID NO: 13             moltype = DNA   length = 141
FEATURE                   Location/Qualifiers
source                    1..141
                          mol_type = other DNA
                          organism = Synthetic construct
SEQUENCE: 13
tgtgagttag ctcactcatt aggcacccca ggctttacac tttatgcttc cggctcgtat    60
gttgtgtgga atgcctacaa gcatcgtgga ggtccgtgac tttcacgcat acaacaaaca   120
ttaaccaagg aggaaacagc t                                            141

SEQ ID NO: 14             moltype = DNA   length = 203
```

```
FEATURE              Location/Qualifiers
source               1..203
                     mol_type = other DNA
                     organism = Synthetic construct
SEQUENCE: 14
tgcgtcgcca ttctgtcgca acacgccaga atgcggcggc gatcactaac tcaacaaatc    60
aggcgatgta accgctttca atctgtgagt gatttcacag tatcttaaca atgtgatagc   120
tatgattgca ccgtgcctac aagcatcgtg gaggtccgtg actttcacgc atacaacaaa   180
cattaaccaa aggaaaaaca gct                                           203

SEQ ID NO: 15        moltype = DNA  length = 203
FEATURE              Location/Qualifiers
source               1..203
                     mol_type = other DNA
                     organism = Synthetic construct
SEQUENCE: 15
tgcgtcgcca ttctgtcgca acacgccaga atgcggcggc gatcactaac tcaacaaatc    60
aggcgatgta accgctttca atctgtgagt gatttcacag tatcttaaca atgtgatagc   120
tatgattgca ccgtgcctac aagcatcgtg gaggtccgtg actttcacgc atacaacaaa   180
cattaaccaa ctaggaaaca gct                                           203

SEQ ID NO: 16        moltype = DNA  length = 203
FEATURE              Location/Qualifiers
source               1..203
                     mol_type = other DNA
                     organism = Synthetic construct
SEQUENCE: 16
tgcgtcgcca ttctgtcgca acacgccaga atgcggcggc gatcactaac tcaacaaatc    60
aggcgatgta accgctttca atctgtgagt gatttcacag tatcttaaca atgtgatagc   120
tatgattgca ccgtgcctac aagcatcgtg gaggtccgtg actttcacgc atacaacaaa   180
cattaaccaa ccgagaaaca gct                                           203

SEQ ID NO: 17        moltype = DNA  length = 310
FEATURE              Location/Qualifiers
source               1..310
                     mol_type = other DNA
                     organism = Synthetic construct
SEQUENCE: 17
atgcgcaaat gcggcacgcc ttgcagatta cggtttgcca cactttcat ccttctcctg     60
gtgacataat ccacatcaat cgaaaatgtt aataaatttg ttgcgcgaat gatctaacaa   120
acatgcatca tgtacaatca gatggaataa atggcgcgat aacgctcatt ttatgacgag   180
gcacacacat tttaagttcg atatttctcg tttttgctcg ttaacgataa gtttacagca   240
tgcctacaag catcgtggag gtccgtgact ttcacgcata caacaaacat taaccaacta   300
ggaaacagct                                                          310

SEQ ID NO: 18        moltype = DNA  length = 203
FEATURE              Location/Qualifiers
source               1..203
                     mol_type = other DNA
                     organism = Synthetic construct
SEQUENCE: 18
tgcgtcgcca ttctgtcgca acacgccaga atgcggcggc gatcactaac tcaacaaatc    60
aggcgatgta accgctttca atctgtgagt gatttcacag tatcttaaca atgtgatagc   120
tatgattgca ccgtgcctac aagcatcgtg gaggtccgtg actttcacgc atacaacaaa   180
cattaaccaa gagcaaaaca gct                                           203

SEQ ID NO: 19        moltype = DNA  length = 203
FEATURE              Location/Qualifiers
source               1..203
                     mol_type = other DNA
                     organism = Synthetic construct
SEQUENCE: 19
tgcgtcgcca ttctgtcgca acacgccaga atgcggcggc gatcactaac tcaacaaatc    60
aggcgatgta accgctttca atctgtgagt gatttcacag tatcttaaca atgtgatagc   120
tatgattgca ccgtgcctac aagcatcgtg gaggtccgtg actttcacgc atacaacaaa   180
cattaaccaa ggaggaaaca gct                                           203

SEQ ID NO: 20        moltype = DNA  length = 189
FEATURE              Location/Qualifiers
source               1..189
                     mol_type = other DNA
                     organism = Synthetic construct
SEQUENCE: 20
gaaaacattc ataaattaaa tgtgaattgc cgcacacatt attaaataag atttacaaaa    60
tgttcaaaat gacgcatgaa atcacgtttc actttcgaat tatgagcgaa tatgcgcgat   120
gcctacaagc atcgtggagg tccgtgactt tcacgcatac aacaaacatt aaccaaggag   180
gaaacagct                                                           189

SEQ ID NO: 21        moltype = DNA  length = 239
```

```
FEATURE                 Location/Qualifiers
source                  1..239
                        mol_type = other DNA
                        organism = Synthetic construct
SEQUENCE: 21
ccatttagcc atagtaaaaa catgaattgt ttgatttcgc gcatattcgc tcataattcg    60
aaagtgaaac gtgatttcat gcgtcatttt gaacattttg taaatcttat ttaataatgt   120
gtgcggcaat tcacatttaa tttatgaatg ttttcttaac atcgcggcat gcctacaagc   180
atcgtggagg tccgtgactt tcacgcatac aacaaacatt aaccaaggag gaaacagct    239

SEQ ID NO: 22           moltype = DNA   length = 300
FEATURE                 Location/Qualifiers
source                  1..300
                        mol_type = genomic DNA
                        organism = Escherichia coli
SEQUENCE: 22
gcggcacgcc ttgcagatta cggtttgcca cacttttcat ccttctcctg gtgacataat    60
ccacatcaat cgaaaatgtt aataaatttg ttgcgcgaat gatctaacaa acatgcatca   120
tgtacaatca gatggaataa atggcgcgat aacgctcatt ttatgacgag gcacacacat   180
tttaagttcg atatttctcg tttttgctcg ttaacgataa gtttacagca tgcctacaag   240
catcgtggag gtccgtgact ttcacgcata acaaacat taaccaagga ggaaacagct    300

SEQ ID NO: 23           moltype = DNA   length = 310
FEATURE                 Location/Qualifiers
source                  1..310
                        mol_type = other DNA
                        organism = Synthetic construct
SEQUENCE: 23
atgcgcaaat gcggcacgcc ttgcagatta cggtttgcca cacttttcat ccttctcctg    60
gtgacataat ccacatcaat cgaaaatgtt aataaatttg ttgcgcgaat gatctaacaa   120
acatgcatca tgtacaatca gatggaataa atggcgcgat aacgctcatt ttatgacgag   180
gcacacacat tttaagttcg atatttctcg tttttgctcg ttaacgataa gtttacagca   240
tgcctacaag catcgtggag gtccgtgact ttcacgcata acaaacatt aaccaactg    300
agaaacagct                                                          310

SEQ ID NO: 24           moltype = DNA   length = 310
FEATURE                 Location/Qualifiers
source                  1..310
                        mol_type = other DNA
                        organism = Synthetic construct
SEQUENCE: 24
atgcgcaaat gcggcacgcc ttgcagatta cggtttgcca cacttttcat ccttctcctg    60
gtgacataat ccacatcaat cgaaaatgtt aataaatttg ttgcgcgaat gatctaacaa   120
acatgcatca tgtacaatca gatggaataa atggcgcgat aacgctcatt ttatgacgag   180
gcacacacat tttaagttcg atatttctcg tttttgctcg ttaacgataa gtttacagca   240
tgcctacaag catcgtggag gtccgtgact ttcacgcata acaaacatt aaccaaccg    300
agaaacagct                                                          310

SEQ ID NO: 25           moltype = DNA   length = 310
FEATURE                 Location/Qualifiers
source                  1..310
                        mol_type = other DNA
                        organism = Synthetic construct
SEQUENCE: 25
atgcgcaaat gcggcacgcc ttgcagatta cggtttgcca cacttttcat ccttctcctg    60
gtgacataat ccacatcaat cgaaaatgtt aataaatttg ttgcgcgaat gatctaacaa   120
acatgcatca tgtacaatca gatggaataa atggcgcgat aacgctcatt ttatgacgag   180
gcacacacat tttaagttcg atatttctcg tttttgctcg ttaacgataa gtttacagca   240
tgcctacaag catcgtggag gtccgtgact ttcacgcata acaaacatt aaccaagag    300
aaaaacagct                                                          310

SEQ ID NO: 26           moltype = DNA   length = 350
FEATURE                 Location/Qualifiers
source                  1..350
                        mol_type = other DNA
                        organism = Synthetic construct
SEQUENCE: 26
tgcgtcgcca ttctgtcgca acacgccaga atgcggcggc gatcactaac tcaacaaatc    60
aggcgatgta accgctttca atctgtgagt gatttccag tatcttaaca atgtgatagc   120
tatgattgca ccgttttaac gttgtaaccc gtatgtaaca gtgaataatc acttttgccg   180
aggtaacagc gtcataacaa caattaaagc cgttttctgg agcgttaccg ggcatggaag   240
aacgaatttt aaaagtgag cttcggcgtt cagtaacact tcattaactc tactgccccg    300
ccgagcattt atctcaagca ctaccctgca taagcaagga ggaaacagct               350

SEQ ID NO: 27           moltype = DNA   length = 310
FEATURE                 Location/Qualifiers
source                  1..310
                        mol_type = other DNA
                        organism = Synthetic construct
```

```
SEQUENCE: 27
atgcgcaaat gcggcacgcc ttgcagatta cggtttgcca cactttcat ccttctcctg    60
gtgacataat ccacatcaat cgaaaatgtt aataaatttg ttgcgcgaat gatctaacaa   120
acatgcatca tgtacaatca gatggaataa atggcgcgat aacgctcatt ttatgacgag   180
gcacacacat tttaagttcg atatttctcg tttttgctcg ttaacgataa gtttacagca   240
tgcctacaag catcgtggag gtccgtgact ttcacgcata aacaaacat taaccaaagg    300
aaaaacagct                                                          310

SEQ ID NO: 28         moltype = DNA   length = 300
FEATURE               Location/Qualifiers
source                1..300
                      mol_type = other DNA
                      organism = Synthetic construct
SEQUENCE: 28
gcggcacgcc ttgcagatta cggtttgcca cacttttcat ccttctcctg gtgacataat    60
ccacatcaat cgaaaatgtt aataaatttg ttgcgcgaat gatctaacaa acatgcatca   120
tgtacaatca gatggaataa atggcgcgat aacgctcatt ttatgacgag gcacacacat   180
tttaagttcg atatttctcg tttttgctcg ttaacgataa gtttacagca tgcctacaag   240
catcgtggag gtccgtgact ttcacgcata aacaaacat taaccaagag caaaacagct    300

SEQ ID NO: 29         moltype = DNA   length = 310
FEATURE               Location/Qualifiers
source                1..310
                      mol_type = other DNA
                      organism = Synthetic construct
SEQUENCE: 29
atgcgcaaat gcggcacgcc ttgcagatta cggtttgcca cacttttcat ccttctcctg    60
gtgacataat ccacatcaat cgaaaatgtt aataaatttg ttgcgcgaat gatctaacaa   120
acatgcatca tgtacaatca gatggaataa atggcgcgat aacgctcatt ttatgacgag   180
gcacacacat tttaagttcg atatttctcg tttttgctcg ttaacgataa gtttacagca   240
tgcctacaag catcgtggag gtccgtgact ttcacgcata aacaaacat taaccaagag    300
ctaaacagct                                                          310

SEQ ID NO: 30         moltype = DNA   length = 189
FEATURE               Location/Qualifiers
source                1..189
                      mol_type = other DNA
                      organism = Synthetic construct
SEQUENCE: 30
gaaaacattc ataaattaaa tgtgaattgc cgcacacatt attaaataag atttacaaaa    60
tgttcaaaat gacgcatgaa atcacgtttc actttcgaat tatgagcgaa tatgcgcgat   120
gcctacaagc atcgtggagg tccgtgactt tcacgcatac aacaaacatt aaccaaggag   180
gaaacagct                                                           189

SEQ ID NO: 31         moltype = DNA   length = 107
FEATURE               Location/Qualifiers
source                1..107
                      mol_type = genomic DNA
                      organism = Escherichia coli
SEQUENCE: 31
tgtgagttag ctcactcatt aggcacccca ggctttacac tttatgcttc cggctcgtat    60
gttgtgtgga attgtgagcg gataacaatt tcacacagga aacagct                 107

SEQ ID NO: 32         moltype = DNA   length = 300
FEATURE               Location/Qualifiers
source                1..300
                      mol_type = other DNA
                      organism = Synthetic construct
SEQUENCE: 32
gcggcacgcc ttgcagatta cggtttgcca cacttttcat ccttctcctg gtgacataat    60
ccacatcaat cgaaaatgtt aataaatttg ttgcgcgaat gatctaacaa acatgcatca   120
tgtacaatca gatggaataa atggcgcgat aacgctcatt ttatgacgag gcacacacat   180
tttaagttcg atatttctcg tttttgctcg ttaacgataa gtttacagca tgcctacaag   240
catcgtggag gtccgtgact ttcacgcata aacaaacat taaccaagaa caaaacagct    300

SEQ ID NO: 33         moltype = DNA   length = 300
FEATURE               Location/Qualifiers
source                1..300
                      mol_type = other DNA
                      organism = Synthetic construct
SEQUENCE: 33
gcggcacgcc ttgcagatta cggtttgcca cacttttcat ccttctcctg gtgacataat    60
ccacatcaat cgaaaatgtt aataaatttg ttgcgcgaat gatctaacaa acatgcatca   120
tgtacaatca gatggaataa atggcgcgat aacgctcatt ttatgacgag gcacacacat   180
tttaagttcg atatttctcg tttttgctcg ttaacgataa gtttacagca tgcctacaag   240
catcgtggag gtccgtgact ttcacgcata aacaaacat taaccaaatt cgaaacagct    300

SEQ ID NO: 34         moltype = DNA   length = 152
FEATURE               Location/Qualifiers
```

```
source                  1..152
                        mol_type = genomic DNA
                        organism = Klebsiella pneumoniae
SEQUENCE: 34
ggttaacggc ccactttgct ggcgacatca caattcttaa accggtttag caatttttat    60
tttcaccgcg ttaccgacat gtttaccata tcaactaaac cggtttagca aacattagca   120
cactcactga tttacctttg gatgtcacca ac                                 152

SEQ ID NO: 35           moltype = DNA   length = 1158
FEATURE                 Location/Qualifiers
source                  1..1158
                        mol_type = genomic DNA
                        organism = Escherichia coli
SEQUENCE: 35
atgaacccag tacccgcgca acgtgaatat ttcctcgact ccatccgcgc ctggctgatg    60
ttgttaggga tacctttttca tatttcttta atctattcga gccatacatg gcatgtgaat  120
agcgccgaat catcattgtg gctgacccct tttaatgact tcatccactc gttccgcatg   180
caggtatttt tcgttatatc cggctacttt tcctacacgt tttttttacg ctatccccttg  240
aaaaaatggt ggaaagtacg tgtcgaacgt gtaggtatcc cgatgttaac agccatcccc   300
ctactgacat taccgcaatt tattatgctg caatatgtca aaggaaaagc ggaaagttgg   360
cctgggctgt cattgtatga caaatataat acgttggcct gggaattaat atcacacctg   420
tggttttttac tggtgttagt ggtcatgacg acgctgtgcg tatggatatt taagcgcatc   480
agaaataatt tagaaaattc tgataaaacg aataaaaaat tctcgatggt aaaactatcg   540
gtgatttttt tatgcctcgg catcggttat gcggtaataa gaagaacgat ttttattgtg   600
tatccgccca ttctgagtaa tggcatgttc aatttttattg tcatgcaaac gctgtttttat  660
ttgccgttct ttatcctcgg cgcactggct ttcattttcc ctcatcttaa agccttgttt   720
accacgccgt ctcgtggctg tacccttgca gcagcattgg cgtttgtcgc ttatttactc   780
aaccagcgct atggcagtgg cgatgcctgg atgtacgaaa ccgagtcggt gatcaccatg   840
gtcctcggtc tgtggatggt gaatgtggtc ttctcctttg gccaccgttt gcttaacttc   900
cagtcagcgc gggtgactta ttttgttaac gcatcgctgt ttatctatct ggttcaccac   960
ccgttaacgc tgtttttcgg cgcatacatt acaccgcaca tcacctccaa ctggcttggt  1020
tttctctgtg gcctgatatt tgtagtaggg attgcgataa ttctgtatga aattcatttg  1080
cgcatcccgt tactgaagtt tttgttctct ggtaaaccgg ttgttaagcg tgagaacgat  1140
aaagcaccag cccgttaa                                                1158

SEQ ID NO: 36           moltype = AA    length = 385
FEATURE                 Location/Qualifiers
source                  1..385
                        mol_type = protein
                        organism = Escherichia coli
SEQUENCE: 36
MNPVPAQREY FLDSIRAWLM LLGIPFHISL IYSSHTWHVN SAESSLWLTL FNDFIHSFRM    60
QVFFVISGYF SYMLFLRYPL KKWWKVRVER VGIPMLTAIP LLTLPQFIML QYVKGKAESW   120
PGLSLYDKYN TLAWELISHL WFLLVLVVMT TLCVWIFKRI RNNLENSDKT NKKFSMVKLS   180
VIFLCLGIGY AVIRRTIFIV YPPILSNGMF NFIVMQTLFY LPFFILGALA FIFPHLKALF   240
TTPSRGCTLA AALAFVAYLL NQRYGSGDAW MYETESVITM VLGLWMVNVV FSFGHRLLNF   300
QSARVTYFVN ASLFIYLVHH PLTLFFGAYI TPHITSNWLG FLCGLIFVVG IAIILYEIHL   360
RIPLLKFLFS GKPVVKREND KAPAR                                         385
```